United States Patent
Mac Manus et al.

(10) Patent No.: US 12,450,508 B2
(45) Date of Patent: Oct. 21, 2025

(54) CATEGORICAL INPUT MACHINE LEARNING MODELS

(71) Applicant: Optum Services (Ireland) Limited, Dublin (IE)

(72) Inventors: Lorcan B. Mac Manus, Kildare (IE); Peter Cogan, Dublin (IE); Conor Breen, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 1194 days.

(21) Appl. No.: 16/938,416

(22) Filed: Jul. 24, 2020

(65) Prior Publication Data

US 2022/0027769 A1  Jan. 27, 2022

(51) Int. Cl.
*G06N 5/045* (2023.01)
*G06N 5/02* (2023.01)
*G06N 20/00* (2019.01)

(52) U.S. Cl.
CPC ............... *G06N 5/045* (2013.01); *G06N 5/02* (2013.01); *G06N 20/00* (2019.01)

(58) Field of Classification Search
CPC .......... G06N 5/045; G06N 20/00; G06N 5/02
See application file for complete search history.

(56) References Cited

U.S. PATENT DOCUMENTS

| | | | |
|---|---|---|---|
| 6,275,806 B1 | 8/2001 | Petrushin | |
| 7,318,051 B2 | 1/2008 | Weston et al. | |
| 7,933,851 B2 | 4/2011 | Tuv | |
| 11,481,647 B1 | 10/2022 | Bataineh et al. | |
| 2006/0161403 A1 | 7/2006 | Jiang et al. | |
| 2010/0049538 A1 | 2/2010 | Frazer et al. | |
| 2012/0035859 A1 | 2/2012 | Thomas | |
| 2013/0262140 A1* | 10/2013 | Friedlander | G16H 40/20 705/3 |
| 2015/0332157 A1 | 11/2015 | Baughman et al. | |
| 2016/0078361 A1 | 3/2016 | Brueckner et al. | |
| 2019/0221311 A1* | 7/2019 | Takeuchi | G06N 3/02 |
| 2019/0286724 A1* | 9/2019 | Kudo | G06N 20/10 |
| 2019/0303994 A1 | 10/2019 | Sesia et al. | |
| 2019/0311301 A1 | 10/2019 | Pyati | |
| 2019/0392268 A1* | 12/2019 | Tariq | G06V 20/56 |
| 2021/0174922 A1* | 6/2021 | Noro | G16H 15/00 |
| 2023/0005574 A1* | 1/2023 | Sparks | G16H 10/20 |

OTHER PUBLICATIONS

Holzinger, Andreas, et al. "What do we need to build explainable AI systems for the medical domain?." arXiv preprint arXiv:1712.09923 (2017). (Year: 2017).*

(Continued)

*Primary Examiner* — Kevin W Figueroa
(74) *Attorney, Agent, or Firm* — Alston & Bird LLP

(57) ABSTRACT

There is a need for more effective and efficient predictive data analysis based at least in part on categorical input data. This need can be addressed by, for example, solutions for performing predictive data analysis that utilize at least one of categorical level merging, mutual-information-based feature filtering, feature-correlation-based feature filtering to generate training data feature value arrangements, as well as training and using categorical input machine learning models trained using the training data feature value arrangements.

20 Claims, 13 Drawing Sheets

(56) References Cited

OTHER PUBLICATIONS

Wang, Yisen, et al. "Symmetric cross entropy for robust learning with noisy labels." Proceedings of the IEEE/CVF international conference on computer vision. 2019. (Year: 2019).*
NonFinal Office Action for U.S. Appl. No. 16/938,380, dated Aug. 16, 2023, (15 pages), Unite States Patent and Trademark Office, US.
NonFinal Office Action for U.S. Appl. No. 16/938,436, dated Aug. 22, 2023, (60 pages), United States Patent and Trademark Office, US.
NonFinal Office Action for U.S. Appl. No. 16/938,461, dated Aug. 22, 2023, (43 pages), United States Patent and Trademark Office, US.
NonFinal Office Action for U.S. Appl. No. 16/938,480, dated Aug. 16, 2023, (16 pages), United States Patent and Trademark Office, US.
Bock, Tim. "Feature Engineering For Categorical Variables," DisplayR Blog Machine Learning, (11 pages), [article, online], [retrieved from the Internet Aug. 3, 2020] <URL: https://www.displayr.com/feature-engineering-for-numeric-variables/>.
Brownlee, Jason. "How To Perform Feature Selection With Categorical Data," Machine Learning Mastery, Nov. 25, 2019, (33 pages), [article, online], [retrieved from the Internet Aug. 3, 2020] <URL: https://machinelearningmastery.com/feature-selection-with-categorical-data/>.
Guo, Cheng et al. "Entity Embeddings of Categorical Variables," arXiv preprint arXiv:1604.06737v1 [cs.LG] Apr. 22, 2016. (9 pages).
Final Rejection Mailed on Dec. 7, 2023 for U.S. Appl. No. 16/938,380, 17 page(s).
Final Rejection Mailed on Dec. 7, 2023 for U.S. Appl. No. 16/938,480, 18 page(s).
Final Rejection Mailed on Feb. 29, 2024 for U.S. Appl. No. 16/938,436, 28 page(s).
Notice of Allowance and Fees Due (PTOL-85) Mailed on Feb. 9, 2024 for U.S. Appl. No. 16/938,480, 8 page(s).
Notice of Allowance and Fees Due (PTOL-85) Mailed on Feb. 13, 2024 for U.S. Appl. No. 16/938,380, 8 page(s).
Final Rejection Mailed on Jun. 28, 2024 for U.S. Appl. No. 16/938,461, 20 page(s).
Frees, Edward W. Regression modeling with actuarial and financial applications. Cambridge University Press, 2009. (Year: 2009).
Notice of Allowance and Fees Due (PTOL-85) Mailed on Jun. 26, 2024 for U.S. Appl. No. 16/938,436, 5 page(s).
Advisory Action (PTOL-303) Mailed on Sep. 5, 2024 for U.S. Appl. No. 16/938,461, 2 page(s).
Notice of Allowance and Fees Due (PTOL-85) Mailed on Sep. 9, 2024 for U.S. Appl. No. 16/938,436, 2 page(s).
Knuth, Donald E. "The Art of Computer Programming: Fundamental Algorithms", vol. 1. Addison-Wesley Professional, 1997. pp. 124-143. (Year: 1997).
Non-Final Rejection Mailed on Dec. 4, 2024 for U.S. Appl. No. 16/938,461, 25 page(s).
Notice of Allowance and Fees Due (PTOL-85) Mailed on May 20, 2025 for U.S. Appl. No. 16/938,461, 7 page(s).

* cited by examiner

| # | Prediction | Logic |
|---|---|---|
| 1 | 3.48% | cpt=='45380' & prov_serv_partic=='P' |
| 2 | 7.37% | cpt=='20610' |
| 3 | 62.45% | cpt=='99222' & cpt_rvu!='3' & cpt_upcoded=='0' & mod1=='57' & prov_bill_catgy_cd!='0097' |
| 4 | 22.93% | cpt!='99205' & cpt!='J2001' & mod1=='XU' |

1100

1101 — Prediction
1102 — Logic

FIG. 11A

| Model ID | Probability of True | Model Complexity |
|---|---|---|
| 1 | 0.7623724170022890 | 15 |
| 2 | 0.7623724170022890 | 15 |
| 3 | 0.7623724170022890 | 16 |
| 4 | 0.7623724170022890 | 16 |
| 5 | 0.7623724170022890 | 17 |
| 6 | 0.7623724170022890 | 17 |
| 7 | 0.7615093544240 | 9 |
| 8 | 0.7615093544240 | 9 |

FIG. 11B

Logic for this model:

```
   col  value  col_logic
1: cpt  99153  TRUE
2: prov_bill_partic  P  TRUE
```

As Boolean logic:
cpt=='99153' & prov_bill_partic=='P'
Training set probability for this logic: 67.39%.

FIG. 11C

CATEGORICAL INPUT MACHINE LEARNING MODELS

BACKGROUND

Various embodiments of the present invention address technical challenges related to performing predictive data analysis using categorical input data. Various embodiments of the present invention address the shortcomings of existing predictive data analysis systems and disclose various techniques for efficiently and reliably performing predictive data analysis using categorical input data.

BRIEF SUMMARY

In general, embodiments of the present invention provide methods, apparatus, systems, computing devices, computing entities, and/or the like for performing predictive data analysis using categorical input data. Certain embodiments of the present invention utilize systems, methods, and computer program products that perform predictive data analysis by utilizing at least one of categorical level merging, mutual-information-based feature filtering, feature-correlation-based feature filtering, as well as training and using categorical input machine learning models trained using training data feature value arrangements.

In accordance with one aspect, a method is provided. In one embodiment, the method comprises identifying an initial training set comprising a plurality of training data entries, wherein: (i) each training data entry of the plurality of training data entries is associated with a training data feature value for each initial training data feature of the plurality of initial training data features and a training target value for a training target feature, and (ii) each initial training data feature of the plurality of initial training data features is associated with a plurality of initial categorical levels; generating an adjusted training set based at least in part on the initial training set, wherein generating the adjusted training set comprises: generating a plurality of categorically refined features based at least in part on the plurality of initial training data features, wherein: (i) generating the plurality of categorically refined features comprises generating one or more adjusted categorical levels based at least in part on the plurality of initial categorical levels for each initial training data feature, and (ii) generating the one or more adjusted categorical levels for an initial training data feature of the plurality of initial training data features is performed based at least in part on a per-level predictive correlation measure for each initial categorical level of the plurality of initial categorical levels that is associated with the training data feature in relation to the training target feature, and generating the adjusted training set based at least in part on the plurality of categorically refined features; generating a categorical input machine learning model based at least in part on the adjusted training set; and enabling access to the categorical input machine learning model to generate one or more inferred predictions based at least in part on a prediction input data entry and to perform one or more prediction-based actions based at least in part on the one or more inferred predictions.

In accordance with one aspect, a method is provided. In one embodiment, the method comprises identifying an initial training set comprising a plurality of training data entries, wherein: (i) each training data entry of the plurality of training data entries is associated with a training data feature value for each initial training data feature of the plurality of initial training data features and a training target value for a training target feature, and (ii) each initial training data feature of the plurality of initial training data features is associated with a plurality of initial categorical levels; generating an adjusted training set based at least in part on the initial training set, wherein generating the adjusted training set comprises: generating a plurality of limited noise features based at least in part on the plurality of initial training data features, wherein generating the plurality of limited noise features comprises determining a limited noise subset of the plurality of initial training data features based at least in part on a per-feature mutual information measure for each initial training data feature of the plurality of initial training data features, and generating the adjusted training set based at least in part on the plurality of limited noise features; generating a categorical input machine learning model based at least in part on the adjusted training set; and enabling access to the categorical input machine learning model to generate one or more inferred predictions based at least in part on a prediction input data entry and to perform one or more prediction-based actions based at least in part on the one or more inferred predictions.

In accordance with one aspect, a method is provided. In one embodiment, the method comprises identifying an initial training set comprising a plurality of training data entries, wherein: (i) each training data entry of the plurality of training data entries is associated with a training data feature value for each initial training data feature of the plurality of initial training data features and a training target value for a training target feature, and (ii) each initial training data feature of the plurality of initial training data features is associated with a plurality of initial categorical levels; generating an adjusted training set based at least in part on the initial training set, wherein generating the adjusted training set comprises: generating one or more limited correlation features of the plurality of initial training data features, wherein generating the one or more limited correlation features comprises determining a limited correlation subset of the plurality of initial training data features based at least in part on a per-feature-pair symmetric correlation measure for each feature pair of one or more feature pairs comprising a first initial training data feature of the plurality of initial training data features and a second initial training data feature of the plurality of initial training data features, and generating the adjusted training set based at least in part on the one or more limited correlation features; and generating a categorical input machine learning model based at least in part on the adjusted training set; and enabling access to the categorical input machine learning model to generate one or more inferred predictions based at least in part on a prediction input data entry and to perform one or more prediction-based actions based at least in part on the one or more inferred predictions.

In accordance with one aspect, a method is provided. In one embodiment, the method comprises identifying a training set comprising a plurality of training data entries, wherein each training data entry of the plurality of training data entries is associated with a training data feature value for each training data feature of a plurality of training data features and a training target value for a training target feature; for each training data entry of the plurality of training data entries: determining a plurality of training data feature value arrangements, wherein each training data feature value arrangement of the plurality of training data feature value arrangements comprises a defined value for each training data feature in a related subset of the plurality of training data features, determining a target distribution with respect to the training target feature based at least in part on each training data feature value arrangement of the plurality of training data feature value arrangements, and determining a mean-deviating subset of the plurality of training data feature value arrangements based at least in part on the target distribution; generating a categorical input machine learning model based at least in part on each mean-deviating subset for a training data entry of the plurality of training data entries; and enabling access to the categorical input machine learning model to generate one or more inferred predictions based at least in part on a prediction input data entry and to perform one or more prediction-based actions based at least in part on the one or more inferred predictions.

In accordance with one aspect, a method is provided. In one embodiment, the method comprises identifying a prediction input data entry; identifying a categorical input machine learning model, wherein the categorical input machine learning model defines a plurality of training data feature value arrangements; determining a matching subset of the plurality of training data feature value arrangements that correspond to the prediction input data entry; generating an inferred prediction for the prediction input data entry based at least in part on the matching subset; generating explanatory metadata for the inferred prediction based at least in part on the matching subset; and performing one or more prediction-based actions based at least in part on the inferred prediction and the explanatory metadata.

BRIEF DESCRIPTION OF THE DRAWINGS

Figure 1:
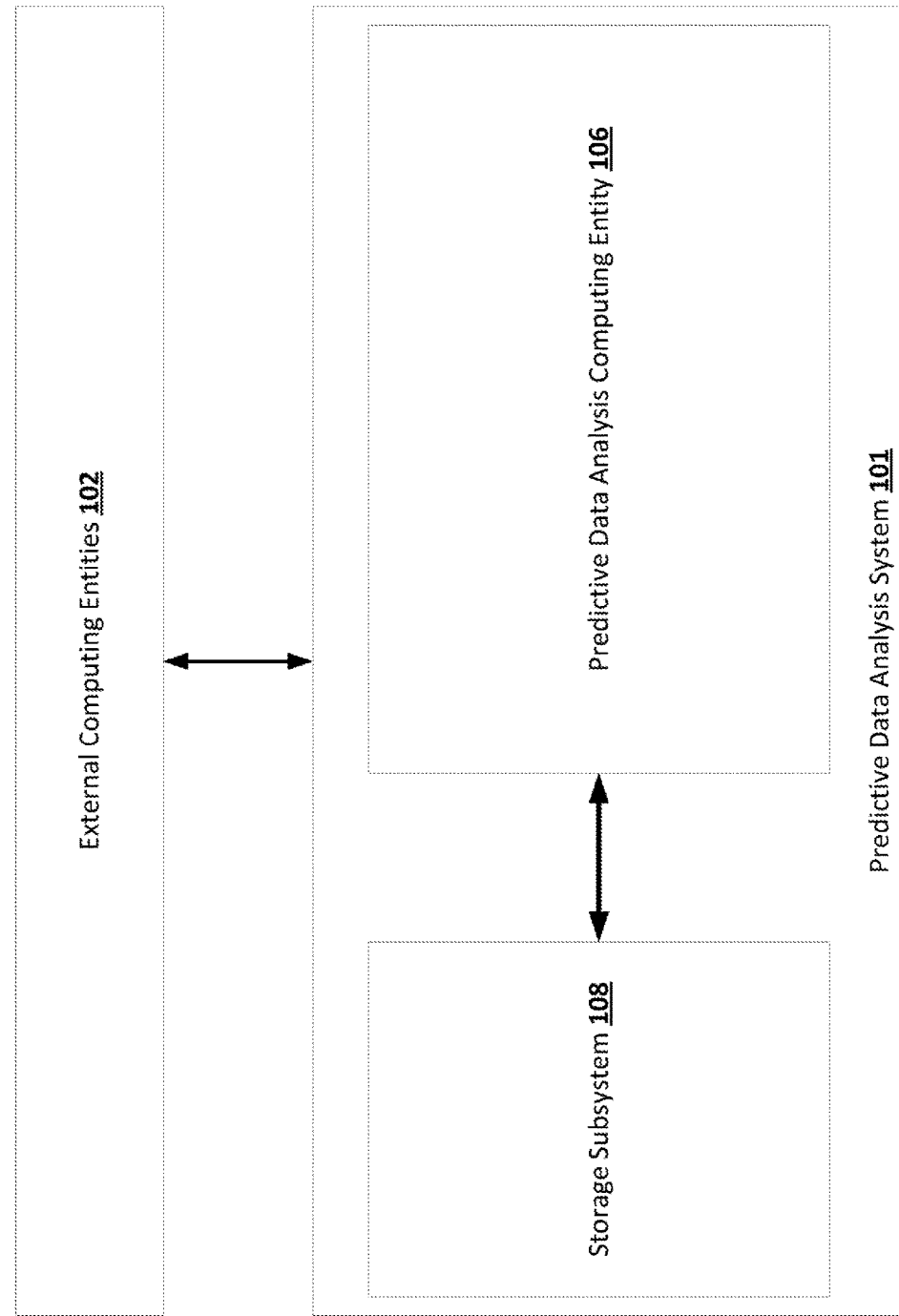

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
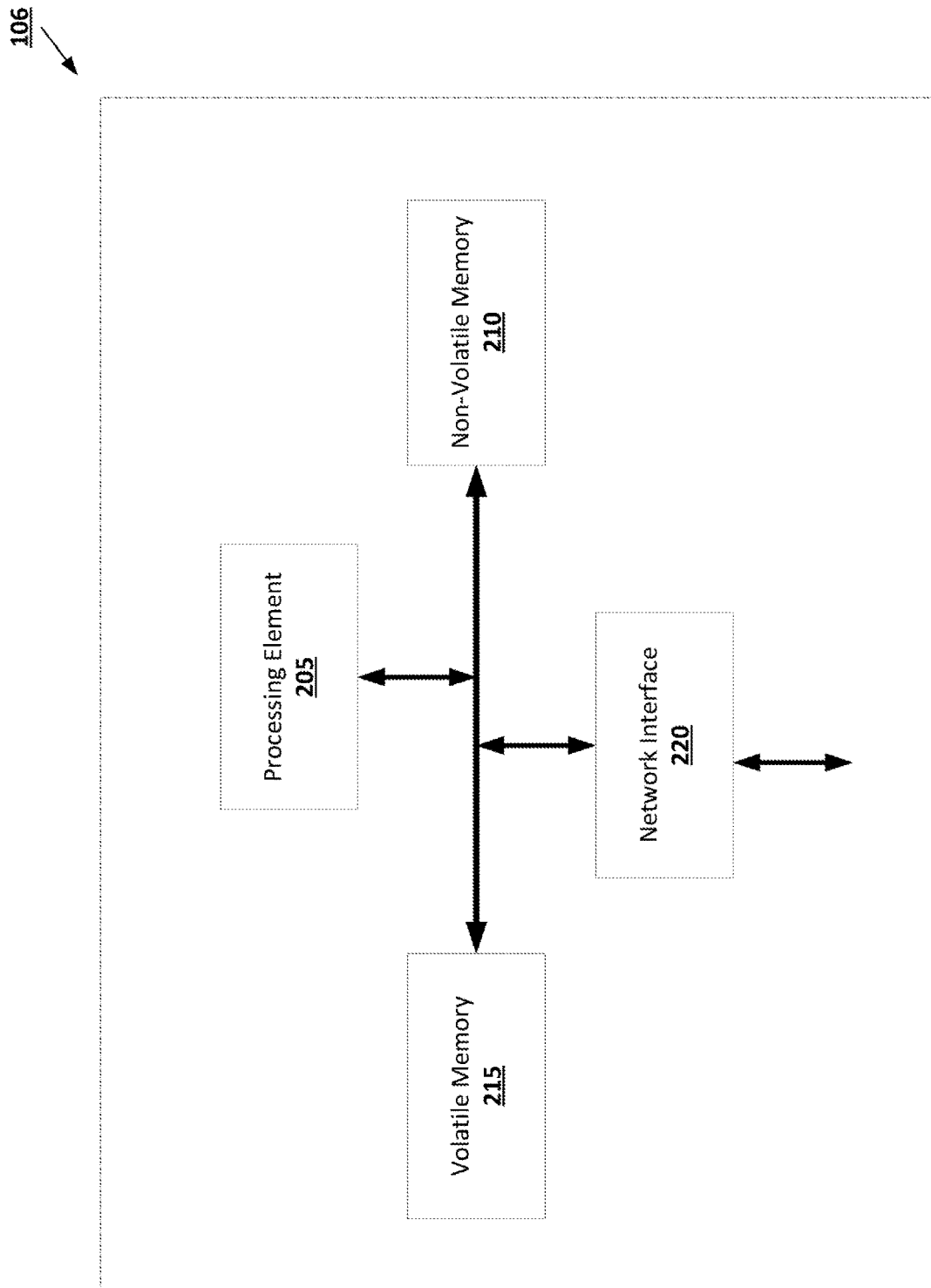

FIG. 2 provides an example predictive data analysis computing entity in accordance with some embodiments discussed herein.

Figure 3:
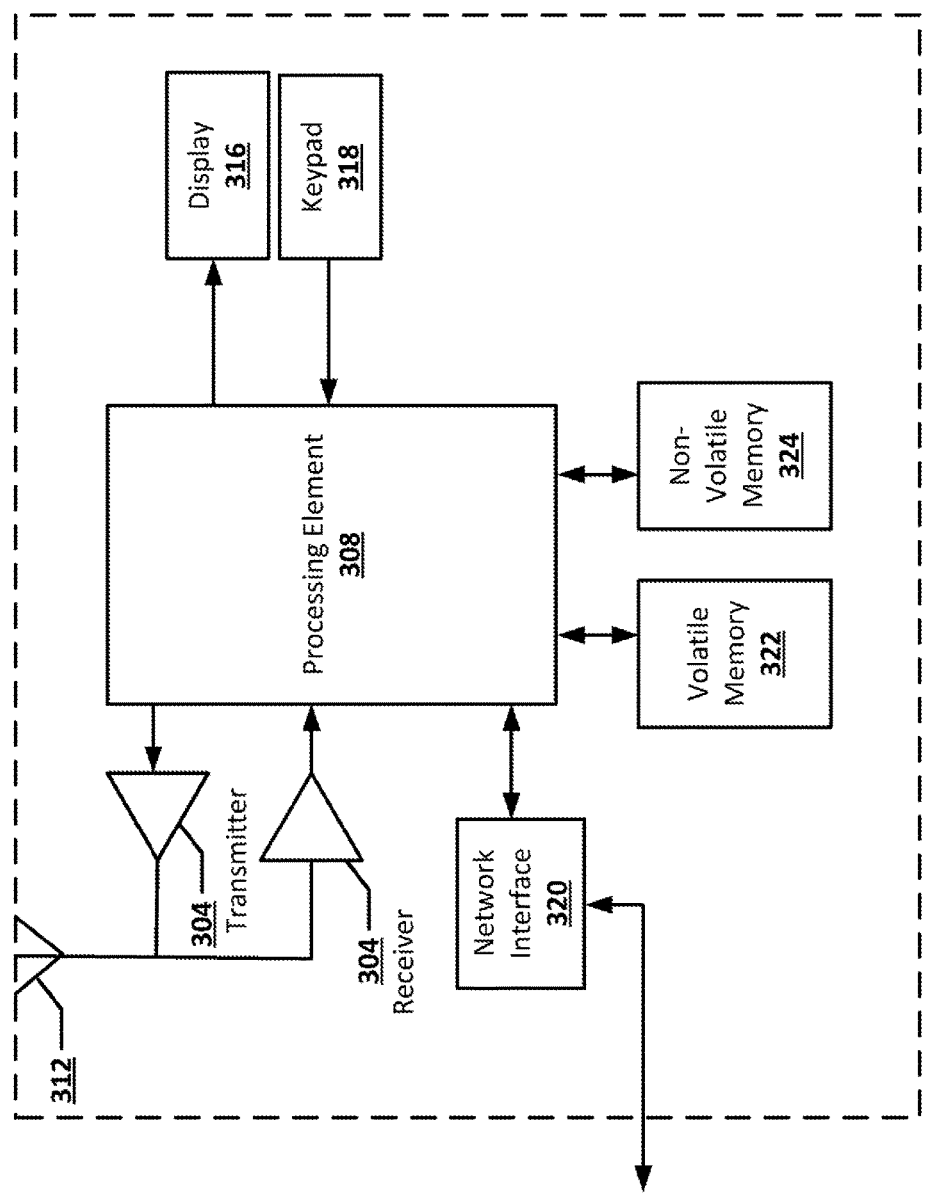

FIG. 3 provides an example external computing entity in accordance with some embodiments discussed herein.

Figure 4:
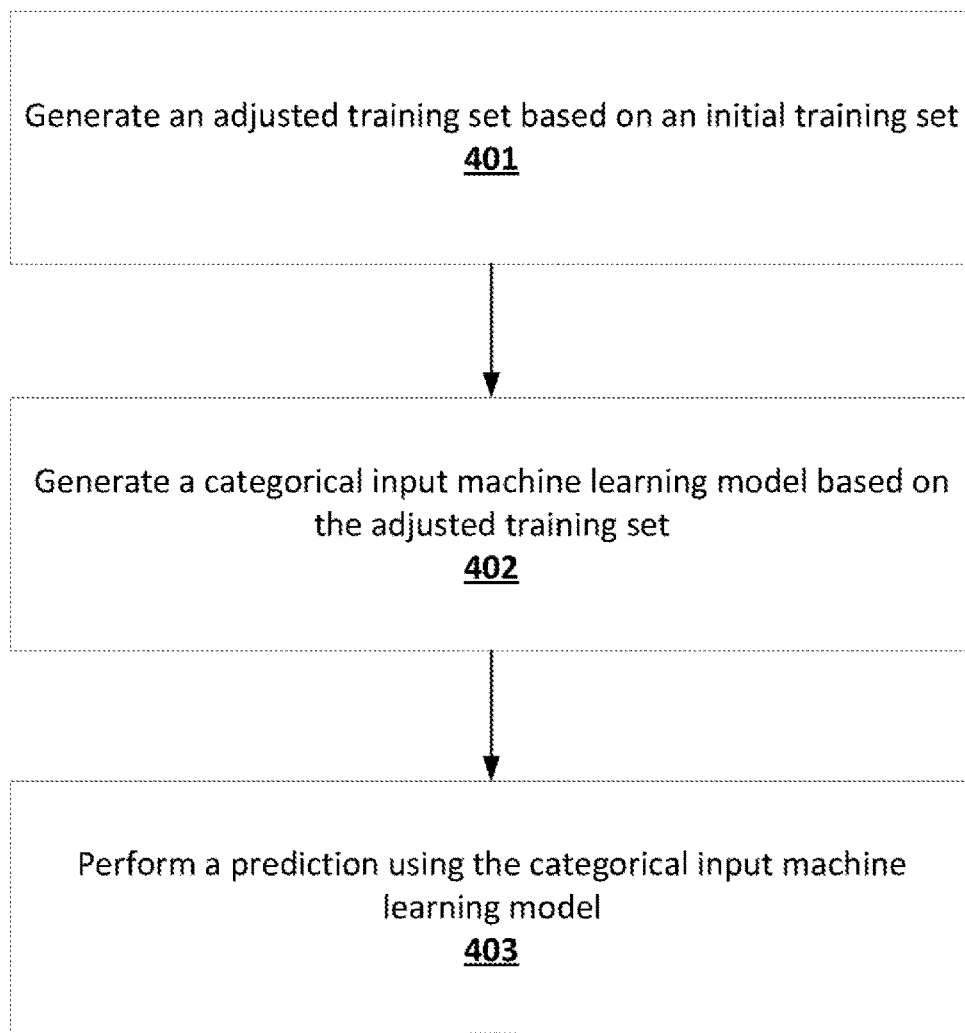

FIG. 4 is a flowchart diagram of an example process for performing predictive data analysis operations based at least in part on categorical input data fields in accordance with some embodiments discussed herein.

Figure 5:
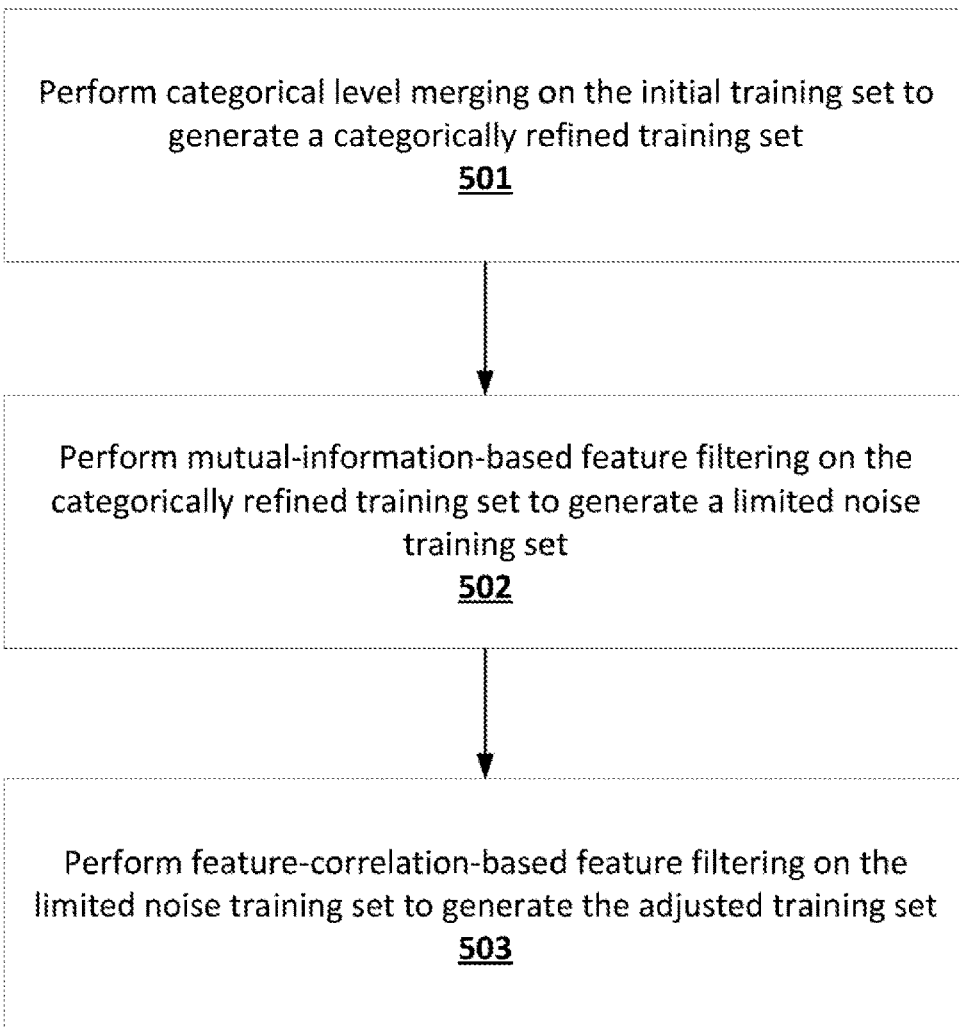

FIG. 5 is a flowchart diagram of generating adjusted training set based at least in part on an initial training set in accordance with some embodiments discussed herein.

Figure 6:
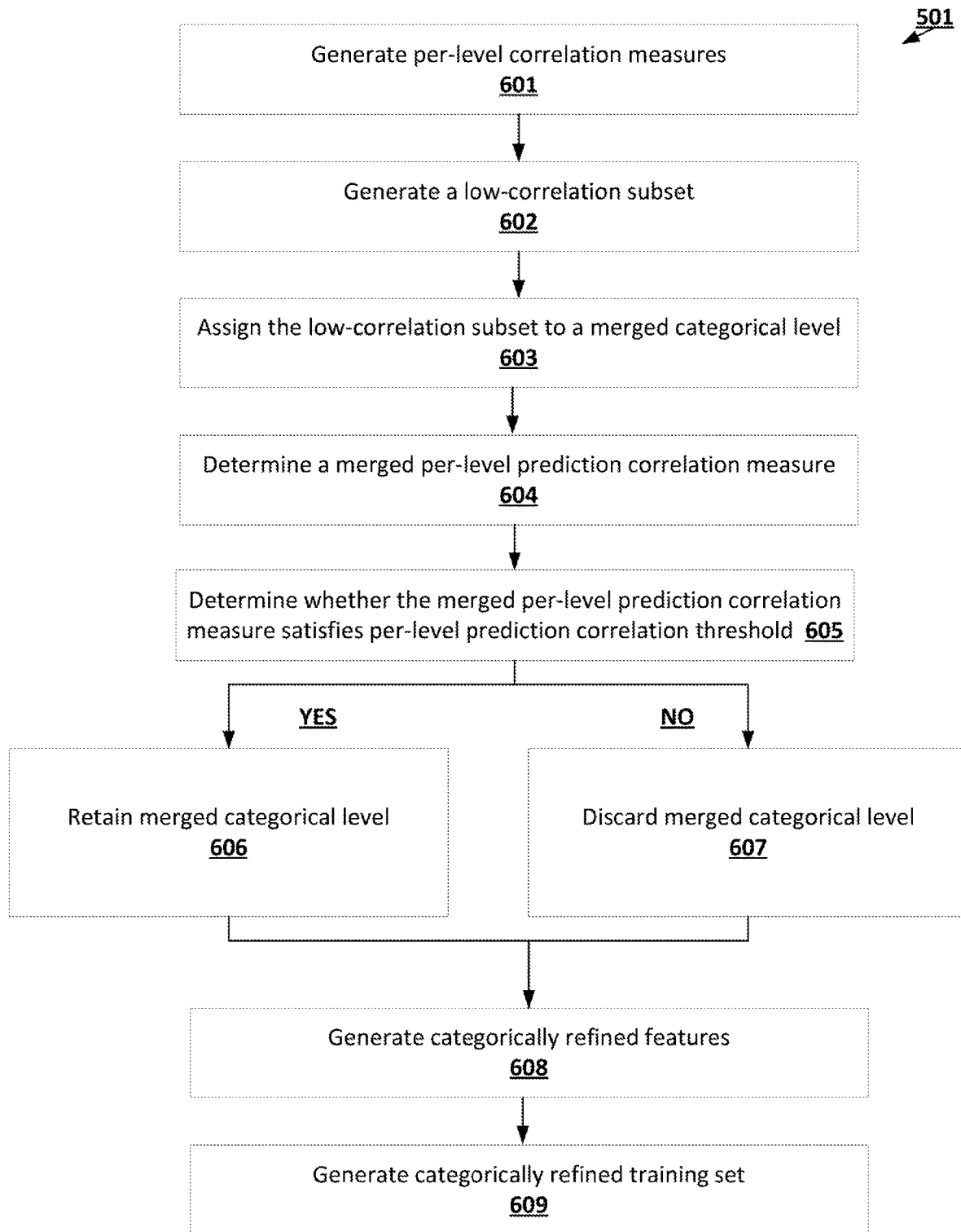

FIG. 6 is a flowchart diagram of an example process for generating a categorically refined training set in accordance with some embodiments discussed herein.

Figure 7:
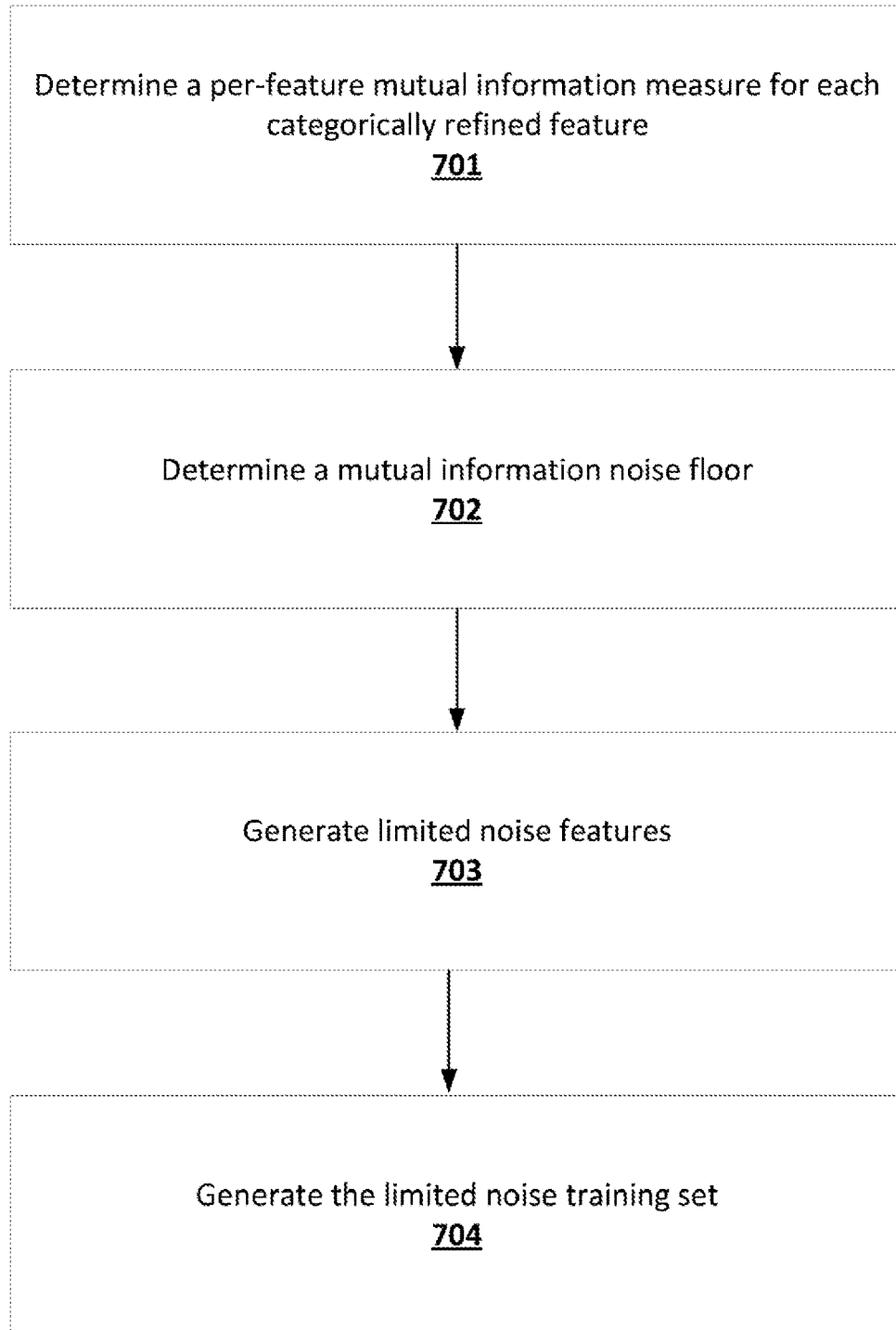

FIG. 7 is a flowchart diagram of an example process for generating a limited noise training set in accordance with some embodiments discussed herein.

Figure 8:
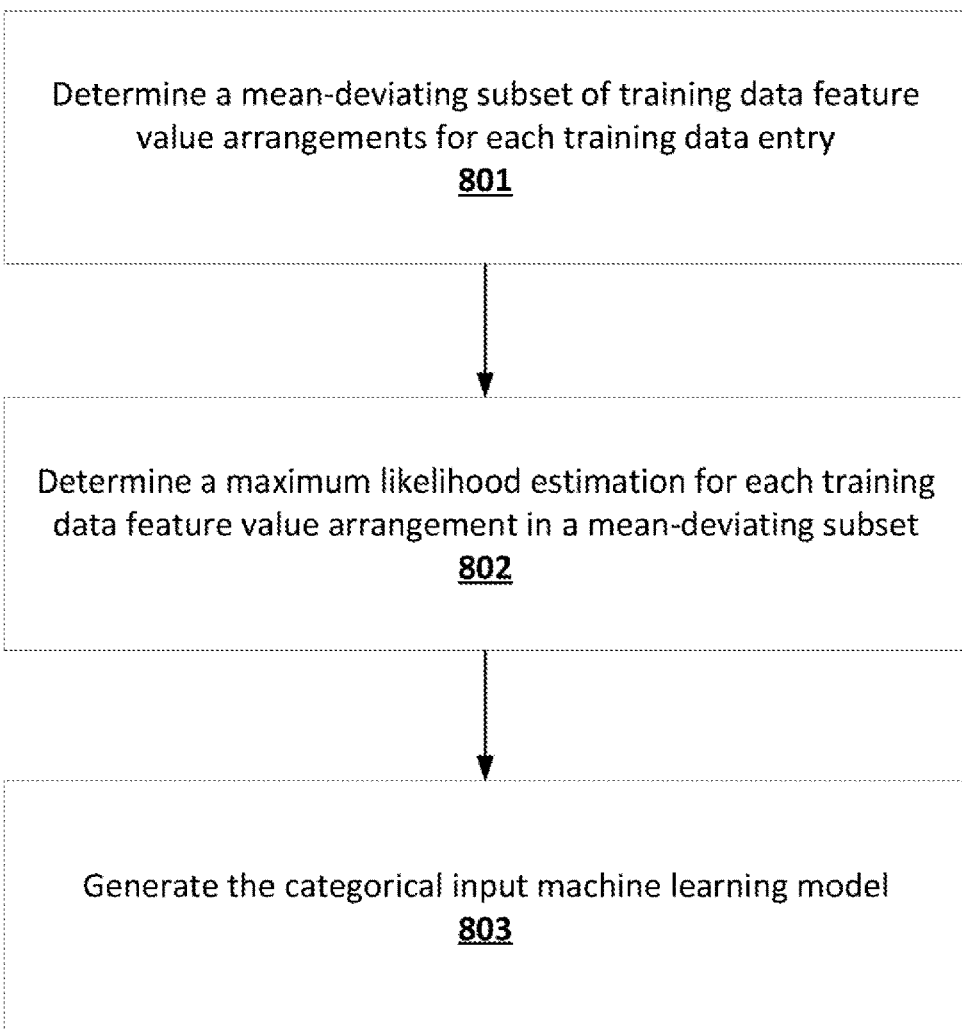

FIG. 8 is a flowchart diagram of an example process for generating a categorical input machine learning model in accordance with some embodiments discussed herein.

Figure 9:
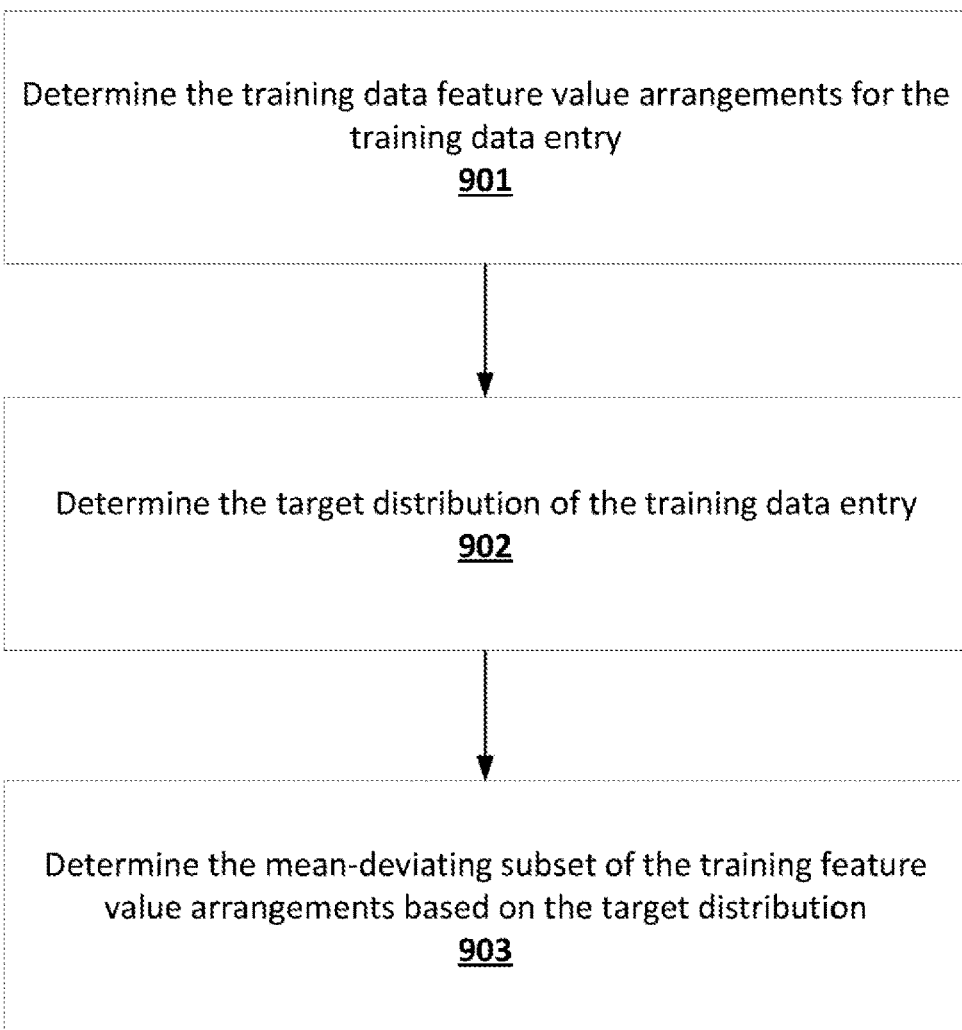

FIG. 9 is a flowchart diagram of an example process for generating the mean-deviating subset of the training feature data values arrangements for a particular training data entry in accordance with some embodiments discussed herein.

Figure 10:
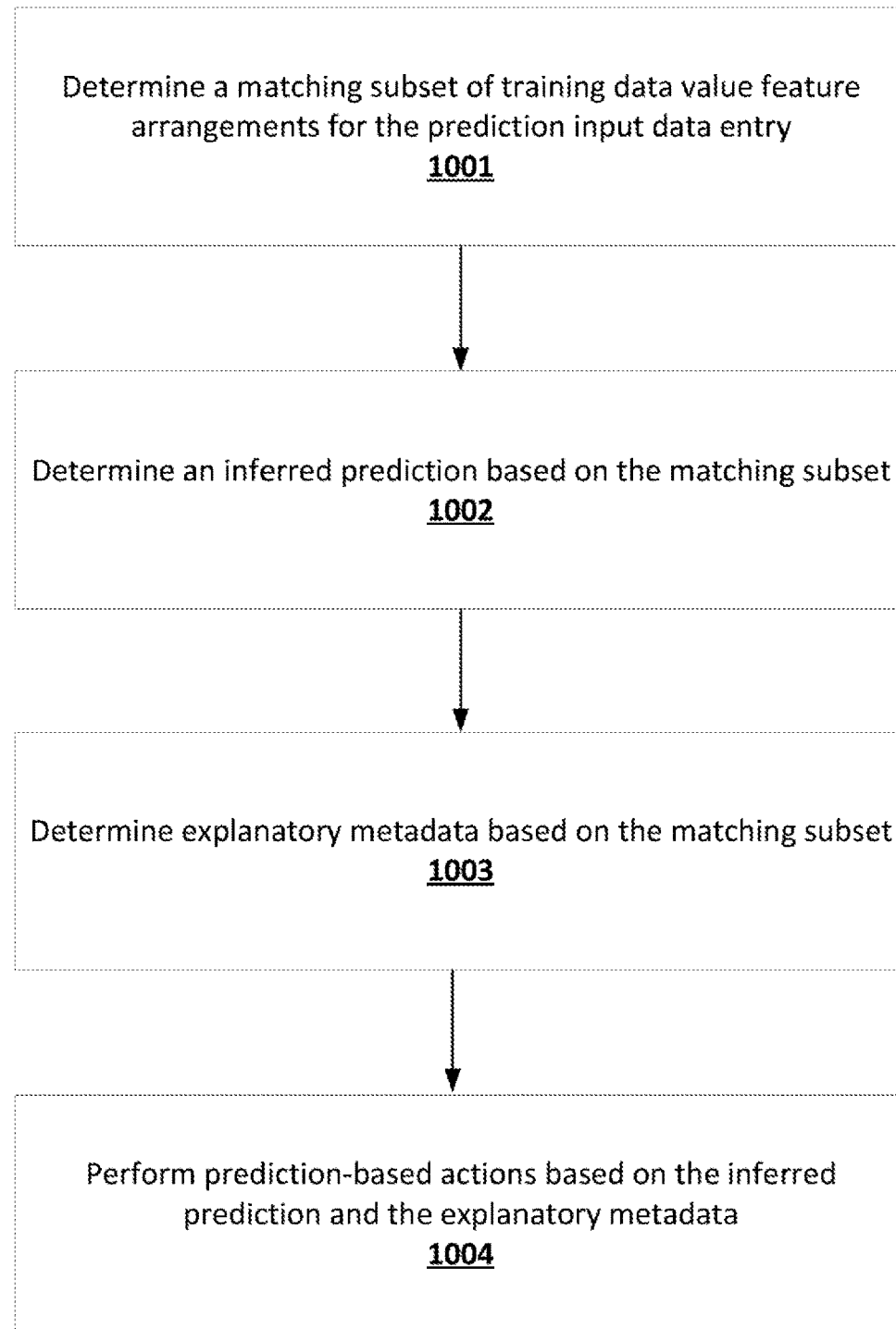

FIG. 10 is a flowchart diagram of an example process for performing a predictive inference using a categorical input machine learning model in accordance with some embodiments discussed herein.

FIGS. 11A-11C provide operational examples of three prediction output user interfaces in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview

Recent significant advances in neural networks have enabled training of very deep networks that have solved long-standing problems in image recognition, voice recognition, translation tasks, and many other such areas. These have led to several eye-catching applications such as Alexa and Google Translate, applications that would have seemed far-fetched even just a few years ago. The proliferation of very large datasets in the categorical-input context (e.g., in the business context) has led to the justifiable expectation that these breakthroughs can be readily applied in diverse business contexts and realize significant business value. However, it is sometimes not fully appreciated that the tasks solved by deep learning all belong to the same family of problems and that both the datasets used and the user expectations in the categorical-input context can be rather different. While some techniques can be transplanted and can generate good results, they were never envisaged as working on structured, highly categorical datasets and numerous heuristics and compromises need to be introduced to enable progress. Furthermore, conventional machine learning models were not designed for interpretability of their outputs, which is often expected in the categorical-input context.

The usual way to deal with categorical data is to find some way of imposing an ordering on the levels in each category and thereafter treat the noted categorical data as numeric. There are many ways to convert categorical data into numeric data. The simplest approach is one-hot-coding, which works well when the cardinality of the categorical data is not excessive. For high cardinality data we can lump less common categories into an "Other" category and thus force an upper limit on the cardinality of any categorical column. This will often work well in practice, though it is clear that we are throwing away information. State of the art algorithms such as H2O's categorical treatments that feed into XGboost or GBMs or CatBoost can be used out-of-the-box for dealing with highly categorical data. In these systems, categorical features are used to build new numeric features based at least in part on categorical features and their combinations. A common approach is target encoding whereby ordinal values are supplied to categorical levels based at least in part on their empirical relationship to the target variable in the supervised context. There is a burgeoning literature on this and other such tricks.

However, the inventors have discovered various shortcomings of the above-described approaches. While the techniques of managing categorical data in traditional machine learning algorithms can achieve considerable success, the paradigm is flawed. Categorical data is non-ordinal by definition. Imposing an ordering adds noise, obscures meaning and may lead to overfitting of models, which in turn decreases the accuracy and reliability of those models when used to make predictions in accordance with categorical input data.

Another significant problem in application of traditional machine learning techniques is that the consumption of business model outputs can come with very different expectations. The breakthroughs that have caught the public imagination all tend to fit into a paradigm of high-volume, low-impact predictions. As these breakthrough technologies are re-purposed away from novelty entertainments, the underlying technologies are being faced with ever greater scrutiny and criticism. To put it simply, nobody really minds if a cat is mis-categorized as a dog, but misclassifying people can be altogether more fraught. These issues are coming to the fore in many business-related contexts.

A distinct though related concern is that as artificial intelligence encroaches upon what was formerly the exclusive preserve of human decision makers they are not unreasonably being held to the same standards: they are now required to "give reasons for the answer." A recent widely publicized case involved an automated system approving larger loans to applicants based at least in part on gender bias in the data. The problem here is not with the algorithm per se (machines are amoral); it is that the reasons for the predictions could not be evaluated by the organization concerned. When it was discovered, it was too late—harm had been caused to people wrongly denied credit, or wrongly advanced too much credit. Significant harm was also done to the company's reputation. For now, the general public has some forbearance when these situations occur as we transition business processes into the previously unchartered waters opened up by artificial intelligence developments, but this forbearance is likely to wane quickly. In the business context we are often interested in making high-impact predictions that may materially affect large numbers of people. The predictions ought to be of high quality and come with explanations that can be readily understood by associated human subject matter experts to carry out review or audit. We need to ensure both correctness of decisions and alignment of these decisions with societal norms and company values.

Another related problem is that models that work so well on translation and image recognition tasks were never designed to provide explanations to people for the predictions they make. Various strategies have been proposed to overcome this limitation. One approach is to implement a primary state-of-the-art machine learning algorithm of choice (e.g., Gradient Boosting Machines, deep learning networks) and then separately and independently apply a secondary interpretable model (e.g., local linear regression) at points of interest within the search space of the primary machine learning algorithm. The best known such approach is probably local interpretable model-agnostic explanation (LIME) models. A second approach is to use a greatly simplified machine learning algorithm (e.g., linear regression in only a small number of coefficients; single decision trees) to try to have the best of both worlds: an machine learning algorithm that is both "good enough" to be useful and "interpretable enough" to be trusted.

The difficulty with the first approach is that it does not really provide any explanations at all. The secondary model simply describes a local region on a much more complex manifold. It makes statements along the lines of: "right here, the Earth looks flat." While such approximations can be useful, they are not deemed credible enough. The problem with the second approach is that while it is possible to get both "good enough" and "interpretable enough" in a small number of settings, it is not possible to do so in general. Each solution is bespoke and requires careful design and communication with stakeholders. Apart from the most trivial cases, there will be considerable degradation in performance compared to opaque state-of-the-art algorithms. Though there is an extensive literature on interpretable machine learning models, the strategies adopted have tended to be afterthoughts to the primary algorithms and so existing solutions remain limited. Until this problem is solved, artificial intelligence as a discipline will fail to extend beyond high-volume, low-impact applications. The wider promise it holds to provide assistance to strategic business decision making will not be realized.

To address the above-noted problems, various embodiments of the present invention introduce important inventive and technologically advantageous concepts configured to utilize statistical relationships between arrangements of feature values among training data to generate models that are configured to generate interpretable prediction outputs. For example, various aspects of the present invention introduce parsimonious construction of models used to process categorical data, where the constructed models utilize statistically significant combinations of data feature values each associated with a point probability estimation to perform predictive inferences by matching prediction input data to the existing models. The constructed models are each statistically significant, which reduces the need for averaging effects of prolific model-building to achieve robust predictions. These robust models are constructed through the systematic application of standard statistical tests at various points to remove false signals, irrelevant features, and redundant information. Moreover, because each of the models is associated with a sequence of conditions (i.e., a sequence of data feature values whose presence in the prediction input is required to satisfy a model), the prediction outputs of such models are easily interpretable.

Other innovative and technologically advantageous aspects of the invention relate to how various embodiments of the present invention preprocess training data prior to performing training. For example, consider the novel and technologically advantageous way in which various embodiments of the present invention perform categorical level merging. The non-novel way to collapse a high categorical vector is to only retain those levels that occur at least some minimum proportion (e.g., 1%) of the time. This is a straight forward approach that will enforce an upper bound on the resulting cardinality of the categorical column (e.g., a cardinality of 100). Variants of the above impose minimum count constraints on the level or merge the least frequent levels while ensuring that this composite level is still the least frequent. While simple, the above-noted approaches are arbitrary and risk throwing away important information. They are rather wasteful in the sense that they retain only a set number of levels in each categorical column when it might be much better to retain more levels in one column and fewer in another—but such simple approaches cannot make these determinations. In contrast, various embodiments of the present invention retain only the levels for which there exist sufficient evidence in our training set that the level will be predictive of the target variable. As another example, various embodiments of the present invention introduce innovative techniques for determining symmetric correlation measures between data features that can be performed in linear time.

II. Definitions

The term "initial training set" may refer to a dataset that describes a group of training data entries, where each training data entry is associated with a group of training data feature values corresponding to a group of initial training data features as well as a training target value for a training target feature. For example, an initial training set may describe medical claim feature data associated for each medical claim in a group of medical claims as well as a ground-truth designation (e.g., a fraud designation) for each medical claim in the group of medical claims. In the noted example, each training data entry in the group of training data entries may describe properties (e.g., claim location, claim category, claim amount, claim provider identifier, and/or the like) of a medical claim in the group of medical claims that is associated with the training data entry, while each training data feature in the group of initial training data features may be associated with a property described by the initial training set, and the ground-truth designation may be an example of a training target feature described by the initial training set. Examples of initial training sets include data constructs that describe two-dimensional tables, such as dataframes in R or in Panda as well as Comma Separated Value (CSV) files.

The term "adjusted training set" may refer to a dataset that describes each training data entry of a corresponding initial training set using a group of training data feature values corresponding to a group of adjusted training data features as well as a training target value for a training target feature. In some of the noted embodiments, the adjusted training data features described by an adjusted training set are determined based at least in part on transforming the initial training data features of the corresponding initial training set by using one or more training input data preprocessing operations, such as by using one or more of categorical level merging, mutual-information-based feature filtering, and feature-correlation-based feature filtering. In some embodiments, an adjusted training set describes each training data entry of a corresponding initial training set as a collection of one-hot-coded training data feature values, where each one-hot-coded training data feature value describes a categorical level of at least some of the categorical levels described by the training data features of the initial training set. For example, consider an initial training set that describes a single training data feature related to the states of residence of individuals. In the noted example, the adjusted training set may describe each training data entry with a first training data feature value that describes using a one-hot-coded value whether the training data entry is associated with the state of California, a second training data feature value that describes using a one-hot-coded value whether the training data entry is associated with the state of New York, a third training data feature value that describes using a one-hot-coded value whether the training data entry is associated with the state of Texas, and a fourth training data feature value that describes using a one-hot-coded value whether the training data entry is associated with a state other than California, New York, and Texas.

The term "categorical level" may refer to a data construct that describes a potential value that may be described by a corresponding feature in a dataset. For example, given a dataset that is characterized by a first feature describing a biological sex designation associated with a training data entry and a second feature describing a month designation associated with a training data entry, the categorical levels of the first feature may include {Male, Female}, while the categorical levels of the second feature may include {January, February, March, April, May, June, July, August, September, October, November, December}. Once a dataset is one-hot-coded, each collection of one or more merged categorical levels may in turn be associated with a one-hot-coded feature. For example, with respect to the exemplary dataset that is characterized by a first feature describing a biological sex designation associated with a training data entry and a second feature describing a month designation associated with a training data entry, the one-hot-coded features of the dataset may include: a first one-hot-coded feature describing whether a training data entry is associated with the male biological sex designation, a second one-hot-coded feature describing whether a training data entry is associated with the female biological sex designation, a third one-hot-coded feature describing whether a training data entry is associated with the January month designation, a fourth one-hot-coded feature describing whether a training data entry is associated with the February month designation, a fifth one-hot-coded feature describing whether a training data entry is associated with the March month designation, a sixth one-hot-coded feature describing whether a training data entry is associated with the April month designation, and so on. As another example, with respect to the exemplary dataset that is characterized by a first feature describing a biological sex designation associated with a training data entry and a second feature describing a month designation associated with a training data entry, the one-hot-coded features of the dataset may include: a first one-hot-coded feature describing whether a training data entry is associated with the male biological sex designation, a second one-hot-coded feature describing whether a training data entry is associated with the female biological sex designation, a third one-hot-coded feature describing whether a training data entry is associated with the January month designation, a fourth one-hot-coded feature describing whether a training data entry is associated with the March month designation, a fifth one-hot-coded feature describing whether a training data entry is associated with the August month designation, and a sixth one-hot-coded feature describing whether a training data entry is associated with a month designation other than January, March, and August.

The term "per-level predictive correlation measure" for a categorical level of a training data feature in a training set may describe a data construct identifying an estimated statistical significance of the categorical level on a training target feature of the training set. In some embodiments, when the training target feature is a binary feature, the per-level predictive correlation measure for a categorical level with respect to the training target feature may be determined using a binomial test at a set confidence value, such as at a confidence level of 0.01. Per-level predictive correlation measures may be determined for both initial categorical levels as well as merged categorical levels determined by combining groups of two or more initial categorical levels.

The term "per-level predictive correlation threshold" may refer to a data construct that describes a value that, when satisfied by the per-level predictive correlation measure of a corresponding categorical level, describes that the statistical correlation between the noted categorical level and a target feature is deemed statistically significant. For example, given a set of categorical levels that each describes a state-level jurisdiction within the United States, and further given a target variable that describes the likelihood that a corresponding entry may be associated with cross-border movements, the per-level predictive correlation measures may describe the likelihood that being a citizen of a particular state has a correlation with the probability of affirmative cross-border movement, and the per-level predictive correlation threshold may describe a value that, when failed to satisfy by a particular categorical level associated with a particular state, describes that being a citizen of the particular state is not deemed to have a significant statistical correlation with being the subject of an affirmative cross-border movement.

The term "adjusted categorical level" may refer to a data construct that describes a categorical level that is deemed to have a statistically significant relationship with a target feature based at least in part on the per-level predictive correlation measure for the adjusted categorical level. Examples of adjusted categorical levels include initial categorical levels whose individual per-level prediction correlation measure satisfies a per-level prediction correlation threshold as well as merged categorical levels each associated with one or more low-correlation categorical levels whose merged per-level prediction correlation measure satisfies a per-level prediction correlation threshold, where the one or more low-correlation categorical levels associated with a particular merged categorical level are each deemed to not be sufficiently statistically significant in predicting the target feature in accordance with the per-level predictive correlation measures of the noted low-correlation categorical levels.

The term "categorically refined feature" may refer to a data construct that describes association of data entries (e.g., training data entries) with at least one corresponding aspect of a corresponding adjusted categorical level. Accordingly, each categorically refined feature may be associated with at least one of an initial categorical level whose per-level predictive correlation measure is deemed to be above a per-level predictive correlation threshold or a merged categorical level whose merged per-level prediction correlation measure is deemed to be above a per-level predictive correlation threshold. For example, consider a scenario in which the adjusted categorical levels include a first categorical level describing whether training data entries are associated with the state of New York, a second categorical level describing whether training data entries are associated with the state of Texas, a third categorical level describing whether training data entries associated with the state of California, and a fourth (merged) categorical level describing whether training data entries are associated with a state other than the states of New York, Texas, and California. In the noted example, categorically refined features may include: a first categorically refined feature describing whether training data entries are associated with the state of New York, a second categorically refined feature describing whether training data entries are associated with the state of Texas, a third categorically refined feature describing whether training data entries associated with the state of California, and a fourth categorically refined feature corresponding to a merged categorical level describing whether training data entries are associated with a state other than the states of New York, Texas, and California.

The term "categorically refined training set" may refer to a training set that includes training data entries that are semantically equivalent to the training data entries of a non-categorically-refined training set, but whose corresponding data features are determined based at least in part on a set of categorically refined features generated by performing categorical level merging on the data features of the non-categorically-refined training set. For example, consider an initial training set that includes a feature describing state of residence of training data entries, where the training data entries of the noted initial training set include a first training data entry associated with a state of Texas and a second training data entry associated with the state of Oklahoma. Consider further that the noted state-level-jurisdiction-describing feature of the initial training set may have in an exemplary embodiment been used to generate the following categorically refined features: a first categorically refined feature describing whether training data entries are associated with the state of New York, a second categorically refined feature describing whether training data entries are associated with the state of Texas, a third categorically refined feature describing whether training data entries associated with the state of California, and a fourth categorically refined feature corresponding to a merged categorical level describing whether training data entries are associated with a state other than the states of New York, Texas, and California. In the noted example, the categorically refined training set corresponding to the noted initial training set may include: a first training data entry corresponding to the first training data entry of the initial training set that has a "1" value for the second categorically refined feature and a "0" value for the remaining categorically refined features, and a second training data entry corresponding to the second training data entry of the initial training set that has a "1" value for the fourth categorically refined feature and a "0" value for the remaining categorically refined features.

The term "per-feature mutual information measure" for a data feature may refer to a data construct that describes a predictive capability of the data values described by the data feature to predicting a particular target feature associated with a corresponding dataset. For example, consider a set of data features that include a first feature describing whether training data entries are associated with the state of New York, a second feature describing whether training data entries are associated with the state of Texas, a third feature describing whether training data entries associated with the state of California, and a fourth feature corresponding to a merged categorical level describing whether training data entries are associated with a state other than the states of New York, Texas, and California. In the noted example, the per-feature mutual information measure for the first feature may describe a predictive capability of association with the state of New York to predicting a target feature, the per-feature mutual information measure for the second feature may describe a predictive capability of association with the state of Texas to predicting a target feature, the per-feature mutual information measure for the third feature may describe a predictive capability of association with the state of California to predicting a target feature, and the per-feature mutual information measure for the fourth feature may describe a predictive capability of association with a state other than New York, Texas, and California to predicting a target feature.

The term "mutual information noise floor" may refer to a data construct that describes a threshold value that, when satisfied (e.g., exceeded) by the per-feature mutual information measure for a corresponding feature (e.g., for a corresponding categorically refined feature), shows that the predictive capability of the corresponding feature with respect to a target feature is deemed sufficiently significant. In some embodiments, a mutual information noise floor is determined based at least in part on a maximum spurious feature ratio for the categorically refined features and a non-spurious feature quantile value for a determined distribution of the per-feature mutual information measures for a set of features associated with the per-feature mutual information measure.

The term "limited noise feature" may refer to any data feature whose per-feature mutual information measure is deemed to satisfy a condition defined by a mutual information noise floor. For example, given a set of data features that include a first feature describing whether training data entries are associated with the state of New York, a second feature describing whether training data entries are associated with the state of Texas, a third feature describing whether training data entries associated with the state of California, and a fourth feature corresponding to a merged categorical level describing whether training data entries are associated with a state other than the states of New York, Texas, and California, if the set of limited noise features does not include the second feature, this may describe that the per-feature mutual information measure for the second field does not satisfy a condition defined by the mutual information noise floor for all four data features.

The term "limited noise training set" may describe any transformed training set that has been generated by removing those data features not deemed to have a sufficient per-feature mutual information measure from a source training set. For example, given a source training set that is associated with a first feature describing whether training data entries are associated with the state of New York, a second feature describing whether training data entries are associated with the state of Texas, a third feature describing whether training data entries associated with the state of California, and a fourth feature corresponding to a merged categorical level describing whether training data entries are associated with a state other than the states of New York, Texas, and California, if only the first and third features are deemed to have a sufficient per-feature mutual information measure, then the limited noise training set generated based at least in part on the noted source training set does not include data features corresponding to the second feature or the fourth feature.

The term "per-feature-pair symmetric correlation measure" may refer to a data construct that describes an estimated level of statistical correlation between values of a corresponding pair of data features in relation to a target feature. For example, a data feature describing education and a data feature describing poverty may have a high statistical correlation in relation to a target feature that describes criminality of individuals described by corresponding training features, and thus a feature pair describing the two noted data features may have a relatively high per-feature-pair symmetric correlation measure. As another example, a data feature describing income and a data feature describing body mass index may have a high statistical correlation in relation to a target feature that describes criminality of individuals described by corresponding training features, and thus a feature pair describing the two noted data features may have a relatively low per-feature-pair symmetric correlation measure.

The term "limited correlation feature" may describe any data feature whose per-feature-pair symmetric correlation measures with respect to other data features associated with a dataset including the limited correlation feature fall below a corresponding per-feature-pair symmetric correlation measure. For example, given a dataset that includes a first data feature describing education, a second data feature describing income, and a third data feature describing body mass index, if the target feature of the dataset is occurrence of criminal conduct in the background of individuals described by the data entries of the dataset, and further if the first data feature is deemed to be sufficiently correlated with the second data feature, the first data feature is deemed to be insufficiently correlated with the third data feature, and the second data feature is deemed to be insufficiently correlated with the third data feature, then the limited correlation features for the dataset may include the first data feature and the third data feature.

The term "limited correlation training set" may describe a training set that is generated by excluding one data feature from each feature pair deemed to have a high degree of per-feature-pair symmetric correlation measure from a source training set. For example, given a source dataset given a dataset that includes a first data feature describing education, a second data feature describing income, and a third data feature describing body mass index, if the limited correlation features for the dataset include the first data feature and the second data feature, then the limited correlation training set may exclude the data values associated with the second data feature.

The term "categorical input machine learning model" may refer to a data construct that describes a collection of patterns of selected values for a group of data features that, when each pattern in the collection of patterns is satisfied by a corresponding prediction input data entry, recommends associating the prediction input data entry with a probability measure for the satisfied pattern. For example, consider a categorical input machine learning model that includes the following collection of patterns: a first pattern according to which a person of a particular educational range and a particular body mass index range residing in Texas is 10% likely to have a particular target feature disease (e.g., the pattern identified by the notation "Education=1, BMI=1, Texas=1→Probability=0.10"); a second pattern according to which a male of the particular educational range and the particular body mass index range is 20% likely to have a particular target feature disease (e.g., the pattern identified by the notation "Male=1, Education=1, BMI=14 Probability=0"); and a third pattern according to which a female of a particular age range is 10% likely to have a particular target feature disease (e.g., the pattern "Male=0, Age=1→Probability=0.10"). In this example, if the categorical input machine learning model is presented with a prediction input data entry that describes a female of the particular age range residing in Texas, the categorical input machine learning model may be configured to recommend that the prediction input data entry be associated with a 10% likelihood of the target disease prediction.

The term "training data feature value arrangement" may refer to a collection of selected values for an associated group of training data features. An exemplary training data feature value arrangement is one associated with a first pattern according to which a person of a particular educational range and a particular body mass index range residing in Texas is deemed to have a 10% likelihood of having a particular target feature disease. In the noted example, the noted exemplary training data feature value arrangement may be associated with an affirmative value of male for a first training data feature describing whether a corresponding training data entry has the particular educational range, an affirmative value for a second training data feature describing whether a corresponding data entry has the particular body mass index range, and an affirmative value for a third training data feature describing whether a corresponding data entry is associated with the state of Texas.

The term "target distribution" for a corresponding training data feature value arrangement may refer to a data construct that describes a measure of correlation of the corresponding training data feature value arrangement with respect to a training target feature. For example, given a training data feature value arrangement associated with a first pattern describing a person of a particular educational range and a particular body mass index range residing in Texas, if a training dataset includes twenty training data entries that are associated with the particular educational, the particular body mass index range, the state of Texas, and an affirmative target feature disease, and if the training dataset further includes five training data entries that are associated with the particular educational range, the particular body mass index range, the state of Texas, and a negative target feature disease, then the target distribution for the noted training data feature value arrangement may be characterized by the values of twenty and five respectively.

The term "mean-wide cross-entropy measure" of a training data feature value arrangement may refer to a data construct that describes the cross-entropy of the training data feature value arrangement from a training population mean of the adjusted training subset. In some embodiments, the mean-wide cross-entropy measure for a training data feature value arrangement is determined based at least in part on Kullback-Leibler divergence of the point probability estimation for the training data feature value arrangement from a mean for all of the training data feature value arrangements in the adjusted training dataset.

The term "weighted point probability estimation" for a corresponding training data feature value arrangement may refer to a data construct that describes the point probability estimation of the corresponding training data feature value arrangement along with a weight value for the noted point probability estimation, where the weight value may determine a mean-wide cross-entropy of the point probability estimation for the corresponding training data feature value arrangement (which may be determined, for example, based at least in part on a Kullback-Leibler divergence of the point probability estimation for the training data feature value arrangement from a mean point probability estimation for all of the training data feature value arrangements in the adjusted training dataset).

The term "model complexity measure" may refer to a data construct that describes a number of conditions associated with a pattern of data feature values characterizing a corresponding training data feature value arrangement. For example, given a training data feature value arrangement associated with a first pattern according to which a person of a particular educational range and a particular body mass range index residing in Texas is 10% likely to have a particular target feature disease, the model complexity measure for the noted training data feature value arrangement may be three. As another example, given a training data feature value arrangement associated with a first pattern according to which a person of a particular educational range, a particular income range, and a particular body mass index range residing in Texas is 20% likely to have a particular target feature disease, the model complexity measure for the noted training data feature value arrangement may be four.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across a plurality of architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that a plurality of instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing health-related predictive data analysis. The architecture 100 includes a predictive data analysis system 101 configured to receive predictive data analysis requests from external computing entities 102, process the predictive data analysis requests to generate predictions, provide the generated predictions to the external computing entities 102, and automatically perform prediction-based actions based at least in part on the generated predictions.

In some embodiments, predictive data analysis system 101 may communicate with at least one of the external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more external computing entities 102, process the predictive data analysis requests to generate predictions corresponding to the predictive data analysis requests, provide the generated predictions to the external computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as a plurality of distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division A plurality of Access 2000 (CDMA2000), CDMA2000 1× (1×RTT), Wideband Code Division A plurality of Access (WCDMA), Global System for Mobile Communications (GSM), Enhanced Data rates for GSM Evolution (EDGE), Time Division-Synchronous Code Division A plurality of Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with a plurality of wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with a plurality of wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an artificial intelligence computing entity may comprise one or more predefined and executable program algorithms stored within an onboard memory storage module, and/or accessible over a network. In various embodiments, the artificial intelligence computing entity may be configured to retrieve and/or execute one or more of the predefined program algorithms upon the occurrence of a predefined trigger event.

V. Exemplary System Operations

FIG. 4 is a flowchart diagram of an example process 400 for performing predictive data analysis using categorical input data. Via the various steps/operations of the process 400, a predictive data analysis computing entity 106 can generate a categorical input machine learning model that is configured to efficiently generate interpretable inferred predictions for prediction input data entries.

While various embodiments of the present invention describe performing preprocessing of training data prior to training a categorial input machine learning model, a person of ordinary skill in the relevant technology will recognize that a categorical input machine learning model may be trained without performing all of the training data preprocessing operations discussed herein and/or without performing any of the training data preprocessing operations discussed herein.

A. Training Data Preprocessing Operations

The process 400 begins at step/operation 401 when the predictive data analysis computing entity 106 generates an adjusted training set based at least in part on an initial training set. In some embodiments, to generate an adjusted training set based at least in part on an initial training set, the predictive data analysis computing entity 106 performs the following sequence of training input data preprocessing operations on the initial training set: categorical level merging followed by mutual-information-based feature filtering followed by feature-correlation-based feature filtering. However, while various embodiments of the present invention describe performing categorical level merging followed by mutual-information-based feature filtering followed by feature-correlation-based feature filtering, a person of ordinary skill in the relevant technology will recognize that the three noted training input data preprocessing operations may be performed in any order. Moreover, while various embodiments of the present invention describing generating an adjusted training set based at least in part on an initial training set using categorical level merging, mutual-information-based feature filtering, and feature-correlation-based feature filtering, a person of ordinary skill in the relevant technology will recognize that the adjusted training set may be generated using any one of the noted training input data preprocessing operations and/or may be generated using one or more other training input data preprocessing operations in addition to or instead of categorical level merging, mutual-information-based feature filtering, and feature-correlation-based feature filtering.

In some embodiments, an initial training set is a dataset that describes a group of training data entries, where each training data entry is associated with a group of training data feature values corresponding to a group of initial training data features as well as a training target value for a training target feature. For example, an initial training set may describe medical claim feature data associated with each medical claim in a group of medical claims as well as a ground-truth designation (e.g., a fraud designation) for each medical claim in the group of medical claims. In the noted example, each training data entry in the group of training data entries may describe properties (e.g., claim location, claim category, claim amount, claim provider identifier, and/or the like) of a medical claim in the group of medical claims that is associated with the training data entry, while each training data feature in the group of initial training data features may be associated with a property described by the initial training set, and the ground-truth designation may be an example of a training target feature described by the initial training set. Examples of initial training sets include data constructs that describe two-dimensional tables, such as dataframes in R or Pandas in Python as well as CSV files.

In some embodiments, an adjusted training set is a dataset that describes each training data entry of a corresponding initial training set using a group of training data feature values corresponding to a group of adjusted training data features as well as a training target value for a training target feature. In some of the noted embodiments, the adjusted training data features described by an adjusted training set are determined based at least in part on transforming the initial training data features of the corresponding initial training set by using one or more training input data preprocessing operations, such as by using one or more of categorical level merging, mutual-information-based feature filtering, and feature-correlation-based feature filtering. In some embodiments, an adjusted training set describes each training data entry of a corresponding initial training set as a collection of one-hot-coded training data feature values, where each one-hot-coded training data feature value describes a categorical level of at least one of the categorical levels described by the training data features of the initial training set. For example, consider an initial training set that describes a single training data feature related to the states of residence of individuals. In the noted example, the adjusted training set may describe each training data entry with a first training data feature value that describes using a one-hot-coded value whether the training data entry is associated with the state of California, a second training data feature value that describes using a one-hot-coded value whether the training data entry is associated with the state of New York, a third training data feature value that describes using a one-hot-coded value whether the training data entry is associated with the state of Texas, and a fourth training data feature value that describes using a one-hot-coded value whether the training data entry is associated with a state other than California, New York, and Texas.

In some embodiments, one objective of the step/operation 401 may be to perform the data transformations described by Equation 1:

$$T, T \in Q^N \rightarrow T_B, T \in \{0,1\}^M \quad \text{Equation 1}$$

In Equation 1, T is the initial training set, $T \in Q^N$ is a training data entry in the initial training set, $Q^N$ is a vector of N categorical values, $T_B$ is an adjusted training set, $T \in \{0,1\}^M$ is a training data entry in the adjusted training set, and $\{0,1\}^M$ is a vector of M one-hot-coded values.

In some embodiments, step/operation 401 may be performed in accordance with the process depicted in FIG. 5. The process depicted in FIG. 5 begins at step/operation 501 when the predictive data analysis computing entity 106 performs categorical level merging on the initial training set to generate a categorically refined training set. In some embodiments, to perform categorical level merging, the predictive data analysis computing entity 106 first generates adjusted categorical levels for each initial training data feature of the initial training set. Afterward, the predictive data analysis computing entity 106 generates categorically refined features based at least in part on each combination of adjusted categorical levels for an initial training data feature of the initial training set. Thereafter, the predictive data analysis computing entity 106 generates the categorically refined training set by generating transformed training data entries based at least in part on the categorically refined features.

In general, a categorical level may describe a potential value that may be described by a corresponding feature in a dataset. For example, given a dataset that is characterized by a first feature describing a biological sex designation associated with a training data entry and a second feature describing a month designation associated with a training data entry, the categorical levels of the first feature may include {Male, Female}, while the categorical levels of the second feature may include {January, February, March, April, May, June, July, August, September, October, November, December}. Once a dataset is one-hot-coded, each collection of one or more merged categorical levels may in turn be associated with a one-hot-coded feature. For example, with respect to the exemplary dataset that is characterized by a first feature describing a biological sex designation associated with a training data entry and a second feature describing a month designation associated with a training data entry, the one-hot-coded features of the dataset may include: a first one-hot-coded feature describing whether a training data entry is associated with the male biological sex designation, a second one-hot-coded feature describing whether a training data entry is associated with the female biological sex designation, a third one-hot-coded feature describing whether a training data entry is associated with the January month designation, a fourth one-hot-coded feature describing whether a training data entry is associated with the February month designation, a fifth one-hot-coded feature describing whether a training data entry is associated with the March month designation, a sixth one-hot-coded feature describing whether a training data entry is associated with the April month designation, and so on. As another example, with respect to the exemplary dataset that is characterized by a first feature describing a biological sex designation associated with a training data entry and a second feature describing a month designation associated with a training data entry, the one-hot-coded features of the dataset may include: a first one-hot-coded feature describing whether a training data entry is associated with the male biological sex designation, a second one-hot-coded feature describing whether a training data entry is associated with the female biological sex designation, a third one-hot-coded feature describing whether a training data entry is associated with the January month designation, a fourth one-hot-coded feature describing whether a training data entry is associated with the March month designation, a fifth one-hot-coded feature describing whether a training data entry is associated with the August month designation, and a sixth one-hot-coded feature describing whether a training data entry is associated with a month designation other than January, March, and August.

To perform categorical level merging on the initial training set, the predictive data analysis computing entity 106 may merge categorical levels associated with each initial training data feature of the initial training set to generate merged categorical levels and then may determine whether to retain or discard the noted merged categorical levels. For example, given a first initial training data feature that is associated with initial categorical levels {L1, L2, L3} and a second initial training data feature that is associated with initial categorical levels {L4, L5, L6}, the predictive data analysis computing entity 106 may generate the following adjusted categorical levels for the first initial training data feature: a first adjusted categorical level that describes whether a training data entry is associated with the initial categorical level L1 and a second adjusted categorical level that describes whether a training data entry is associated with the initial categorical level L2 or the initial categorical level L3. In the noted example, the predictive data analysis computing entity 106 may generate only one adjusted categorical level for the second initial training data feature that describes whether a training data entry is associated with the initial categorical level L5.

In some embodiments, step/operation 501 may be performed in accordance with the process described in FIG. 6. The process depicted in FIG. 6 begins at step/operation 601 when the predictive data analysis computing entity 106 generates, for each initial categorical level of an initial training data feature described by the initial training set, a per-level predictive correlation measure in relation to the training target data feature for the initial training set. In other words, the predictive data analysis computing entity 106 determines a per-level predictive correlation measure for each initial categorical level that the initial training set is configured to be able to describe, for example as defined by a schema of the initial training set.

In general, a per-level predictive correlation measure for a categorical level of a training data feature in a training set may describe an estimated statistical significance of the categorical level on a training target feature of the training set. In some embodiments, when the training target feature is a binary feature, the per-level predictive correlation measure for a categorical level with respect to the training target feature may be determined using a binomial test at a set confidence value, such as at a confidence level of 0.01.

Per-level predictive correlation measures may be determined for both initial categorical levels as well as merged categorical levels determined by combining groups of two or more initial categorical levels.

At step/operation 602, the predictive data analysis computing entity 106 generates, for each initial training data feature described by the initial training set, a low-correlation subset of the initial categorical levels associated with the initial training data feature based at least in part on each per-level predictive correlation measure for an initial categorical level associated with the initial training data feature. In some embodiments, to generate the low-correlation subset for a particular initial training data feature, the predictive data analysis computing entity 106 identifies each initial categorical level associated with the particular initial training data feature whose respective per-level predictive correlation measure fails to exceed a per-level predictive correlation threshold, where the per-level predictive correlation threshold may be a hyper-parameter of the predictive data analysis computing entity 106 that is provided by an administrator user profile of the predictive data analysis computing entity 106.

In general, a per-level predictive correlation threshold may describe a value that, when satisfied by the per-level predictive correlation measure of a corresponding categorical level, describes that the statistical correlation between the noted categorical level and a target feature is deemed statistically significant. For example, given a set of categorical levels that each describes a state-level jurisdiction within the United States, and further given a target variable that describes the likelihood that a corresponding entry may be associated with cross-border movements, the per-level predictive correlation measures may describe the likelihood that being a citizen of a particular state has a correlation with the probability of affirmative cross-border movement, and the per-level predictive correlation threshold may describe a value that, when failed to satisfy by a particular categorical level associated with a particular state, describes that being a citizen of the particular state is not deemed to have a significant statistical correlation with being the subject of an affirmative cross-border movement.

At step/operation 603, the predictive data analysis computing entity 106 assigns each initial categorical level in the low-correlation subset of a corresponding initial training data feature to a merged low-correlation categorical level for the corresponding initial training data feature. For example, consider an initial training set characterized by a first initial training data feature that is associated with the initial categorical levels {L1, L2, L3, L4}, where initial categorical levels L1 and L2 exceed the per-level predictive correlation threshold while initial categorical levels L3 and L4 do not, as well as a second initial training data feature that is associated with the initial categorical levels {L5, L6, L7, L8}, where initial categorical level L5 exceeds the per-level predictive correlation threshold while initial categorical levels L6, L7, and L8 do not. In the noted example, after performing step/operation 603, the predictive data analysis computing entity 106 may determine that the first initial training data feature is associated with a low-correlation subset that includes the initial categorical level L3 and the initial categorical level L4, while the second initial training data feature is associated with a low-correlation subset that includes the initial categorical level L6, the initial categorical level L7, and the initial categorical level L8.

At step/operation 604, the predictive data analysis computing entity 106 determines a merged per-level prediction correlation measure for the merged low-correlation categorical level in relation to the training target feature. In some embodiments, to determine the merged per-level prediction correlation measure for the merged low-correlation categorical level, the predictive data analysis computing entity 106 determines the per-level correlation measure of the merged low-correlation categorical level generated at step/operation 603 using the techniques for determining per-level correlation measures that were discussed in relation to step/operation 602 (e.g., using a binomial test at a set confidence value, such as at a confidence level of 0.01).

At step/operation 605, the predictive data analysis computing entity 106 determines whether the merged per-level prediction correlation measure satisfies (e.g., exceeds) a per-level predictive correlation threshold (e.g., a per-level prediction correlation threshold defined as a hyper-parameter of the predictive data analysis computing entity 106 by an administrator user profile associated with the predictive data analysis computing entity 106). At step/operation 606, in response to determining that the merged per-level prediction correlation measure satisfies the per-level predictive correlation threshold, the predictive data analysis computing entity 106 retains the merged per-level correlation measure by generating one or more adjusted categorical levels that comprise each initial categorical level excluded from the low-correlation subset and the merged per-level predictive correlation measure. At step/operation 607, in response to determining that the merged per-level prediction correlation measure fails to satisfy the per-level predictive correlation threshold, the predictive data analysis computing entity 106 discards the merged per-level correlation measure by generating one or more adjusted categorical levels that comprise each initial categorical level excluded from the low-correlation subset but does not comprise the merged per-level predictive correlation measure. In other words, in some embodiments, via the steps/operations 605-607, the predictive data analysis computing entity 106 determines whether to retain those initial categorical levels whose individual per-level prediction correlation measures fails to satisfy the per-level correlation threshold based at least in part on whether a per-level prediction correlation measure for a merged categorical level that includes all of the low-correlation categorical levels satisfies the per-level correlation threshold.

In general, an adjusted categorical level describes a categorical level that is deemed to have a statistically significant relationship with a target feature based at least in part on the per-level predictive correlation measure for the adjusted categorical level. Examples of adjusted categorical levels include initial categorical levels whose individual per-level prediction correlation measure satisfies a per-level prediction correlation threshold as well as merged categorical levels each associated with one or more low-correlation categorical levels whose merged per-level prediction correlation measure satisfies a per-level prediction correlation threshold, where the one or more low-correlation categorical levels associated with a particular merged categorical level are each deemed to not be sufficiently statistically significant in predicting the target feature in accordance with the per-level predictive correlation measures of the noted low-correlation categorical levels.

At step/operation 608, the predictive data analysis computing entity 106 generates categorically refined features based at least in part on the adjusted categorical levels generated at step/operation 606 or at step/operation 607. In other words, after generating the adjusted categorical levels (which may or may not include the merged categorical level for the low-correlation subset of initial categorical levels depending on whether the merged per-level correlation measure for the merged categorical level satisfies the per-level predictive correlation threshold), the predictive data analysis computing entity 106 generates a set of categorically refined features based at least in part on the noted adjusted categorical levels. For example, in some embodiments, to generate the categorically refined features based at least in part on the adjusted categorical levels, the predictive data analysis computing entity 106 generates a one-hot-coded feature for each adjusted categorical level that describes whether a training data entry is associated with the noted adjusted categorical level or is not associated with the noted adjusted categorical level.

In general, a categorically refined feature is a feature that describes association of data entries (e.g., training data entries) with at least one corresponding aspect of a corresponding adjusted categorical level. Accordingly, each categorically refined feature may be associated with at least one of an initial categorical level whose per-level predictive correlation measure is deemed to be above a per-level predictive correlation threshold or a merged categorical level whose merged per-level prediction correlation measure is deemed to be above a per-level predictive correlation threshold. For example, consider a scenario in which the adjusted categorical levels include a first categorical level describing whether training data entries are associated with the state of New York, a second categorical level describing whether training data entries are associated with the state of Texas, a third categorical level describing whether training data entries associated with the state of California, and a fourth (merged) categorical level describing whether training data entries are associated with a state other than the states of New York, Texas, and California. In the noted example, categorically refined features may include: a first categorically refined feature describing whether training data entries are associated with the state of New York, a second categorically refined feature describing whether training data entries are associated with the state of Texas, a third categorically refined feature describing whether training data entries associated with the state of California, and a fourth categorically refined feature corresponding to a merged categorical level describing whether training data entries are associated with a state other than the states of New York, Texas, and California.

At step/operation 609, the predictive data analysis computing entity 106 generates the categorically refined training set based at least in part on the categorically refined features. In some embodiments, to generate the categorically refined training set based at least in part on the categorically refined features, the predictive data analysis computing entity 106 generates a categorically refined training data entry for each training data entry in the initial training set, where the categorically refined training data entry for a corresponding training data entry of the initial training set includes a categorically refined value for each categorically refined feature of the categorically refined features. In some embodiments, to generate the categorically refined training set, subsequent to generating each group of adjusted categorical levels for an initial training data feature, the predictive data analysis computing entity 106 generates a one-hot-coded categorical feature for each categorical level that is among the one or more adjusted categorical levels for an initial training data feature, and modifies the initial training set to comprise, for each training data entry, a categorically refined feature value for each one-hot-coded categorical feature.

In general, a categorically refined training set may be a training set that includes training data entries that are semantically equivalent to the training data entries of a non-categorically-refined training set, but whose corresponding data features are determined based at least in part on a set of categorically refined features generated by performing categorical level merging on the data features of the non-categorically-refined training set. For example, consider an initial training set that includes a feature describing state of residence of training data entries, where the training data entries of the noted initial training set include a first training data entry associated with a state of Texas and a second training data entry associated with the state of Oklahoma. Consider further that the noted state-level-jurisdiction-describing feature of the initial training set may have in an exemplary embodiment been used to generate the following categorically refined features: a first categorically refined feature describing whether training data entries are associated with the state of New York, a second categorically refined feature describing whether training data entries are associated with the state of Texas, a third categorically refined feature describing whether training data entries associated with the state of California, and a fourth categorically refined feature corresponding to a merged categorical level describing whether training data entries are associated with a state other than the states of New York, Texas, and California. In the noted example, the categorically refined training set corresponding to the noted initial training set may include: a first training data entry corresponding to the first training data entry of the initial training set that has a "1" value for the second categorically refined feature and a "0" value for the remaining categorically refined features, and a second training data entry corresponding to the second training data entry of the initial training set that has a "1" value for the fourth categorically refined feature and a "0" value for the remaining categorically refined features.

Returning to FIG. 5, at step/operation 502, the predictive data analysis computing entity 106 performs mutual-information-based feature filtering on the categorically refined training set to generate a limited noise training set. In some embodiments, to generate the limited noise training set based at least in part on the categorically refined training set, the predictive data analysis computing entity 106 first generates a group of limited noise features based at least in part on the categorically refined features of the categorically refined training set, where the limited noise features are a subset of the categorically refined features deemed to have a sufficient per-feature mutual information measure with respect to the training target feature. Afterward, the predictive data analysis computing entity 106 generates the limited noise training set by removing portions (e.g., columns) of the categorically refined training set that correspond to categorically refined features that are excluded from the group of limited noise features (e.g., the categorically defined features deemed to have an insufficient per-feature mutual information measure with respect to the training target feature).

In some embodiments, step/operation 502 may be performed in accordance with the process depicted in FIG. 7. The process depicted in FIG. 7 begins at step/operation 701 when the predictive data analysis computing entity 106 determines a per-feature mutual information measure for each categorically refined feature with respect to the training target feature. In some embodiments, to determine the per-feature mutual information measure for a categorically refined feature, the predictive data analysis computing entity 106 determines a measure of noisiness and/or a measure of statistical relevance of a categorically refined feature in relation to predicting the training target feature, for example based at least in part on a binomial distribution of the training target feature in relation to the categorically refined feature.

In general, a per-feature mutual information measure for a data feature may describe a predictive capability of the data values described by the data feature to predicting a particular target feature associated with a corresponding dataset. For example, consider a set of data features that include a first feature describing whether training data entries are associated with the state of New York, a second feature describing whether training data entries are associated with the state of Texas, a third feature describing whether training data entries associated with the state of California, and a fourth feature corresponding to a merged categorical level describing whether training data entries are associated with a state other than the states of New York, Texas, and California. In the noted example, the per-feature mutual information measure for the first feature may describe a predictive capability of association with the state of New York to predicting a target feature, the per-feature mutual information measure for the second feature may describe a predictive capability of association with the state of Texas to predicting a target feature, the per-feature mutual information measure for the third feature may describe a predictive capability of association with the state of California to predicting a target feature, and the per-feature mutual information measure for the fourth feature may describe a predictive capability of association with a state other than New York, Texas, and California to predicting a target feature.

At step/operation 702, the predictive data analysis computing entity 106 determines a mutual information noise floor for the categorically refined features. In some embodiments, to determine the mutual information measure, the predictive data analysis computing entity 106 first identifies a maximum spurious feature ratio for the categorically refined features. Afterward, the predictive data analysis computing entity 106 determines a non-spurious feature quantile value for a determined distribution of the per-feature mutual information measures for the categorically refined features. Subsequently, the predictive data analysis computing entity 106 determines the mutual information noise floor based at least in part on the non-spurious feature quantile value.

In general, a mutual information noise floor may describe a threshold value that, when satisfied (e.g., exceeded) by the per-feature mutual information measure for a corresponding feature (e.g., for a corresponding categorically refined feature), shows that the predictive capability of the corresponding feature with respect to a target feature is deemed sufficiently significant. In some embodiments, a mutual information noise floor is determined based at least in part on a maximum spurious feature ratio for the categorically refined features and a non-spurious feature quantile value for a determined distribution of the per-feature mutual information measures for a set of features associated with the per-feature mutual information measure.

In some embodiments, to determine the mutual information noise floor (I), the predictive data analysis computing entity 106 computes the maximum empirical estimate of $I(b, T_i)$, where I is a random variable describing per-feature mutual information measures for the categorically refined features, b is a particular categorically refined feature having a one-hot-coded format, and $T_i$ is the training target feature. To compute the maximum empirical estimate of $I(b, T_i)$, the predictive data analysis computing entity 106 may model N trials of a binomial distribution with a probability parameter of 0.5, where the probability parameter of 0.5 is selected to cause the largest deviations from zero in the estimate of I. The value of $(b, T_i)$ is then modeled using the contingency table of Table 1, where $N_0 = |T_i \cap \{0\}|$ (e.g., the number of rows in which the training target feature has a value of zero) and $N_1 = |T_i \cap \{1\}|$ (e.g., the number of rows in which the training target feature has a value of one).

TABLE 1

|  | b = 0 | b = 1 |
| --- | --- | --- |
| $T_i = 0$ | $B_Q(N_0, 1 - q)$ | $B_Q(N_0, q)$ |
| $T_i = 1$ | $B_Q(N, q)$ | $B_Q(N_1, 1 - q)$ |

Table 1 uses the quantile function $B_Q$, which in turn has the parameter q. The parameter q is an example of the non-spurious feature quantile value that may describe a quantile above which a single feature can spuriously exceed a defined threshold. Given $N_C$ columns, q can be approximated using the relationship $$\frac{r}{N_c},$$

where r is the maximum spurious feature ratio for the categorically refined features (i.e., r is the maximum rate at which a system can accidently include a spurious one-hot feature; for example, if given a fixed r=0.001, then we would expect 1,000 one-hot features that pass the noise-floor test to have just one feature that is actually just noise), which may describes the rate at which spurious columns may be passed (i.e., where r determines the fitness of filter, such that smaller r raises the amount of evidence each feature must demonstrate before being allowed to pass through), which may be less than or equal to $10^{-3}$. In some embodiments, r may be defined as a hyper-parameter of the predictive data analysis computing entity 106 by an administrator user profile of the predictive data analysis computing entity 106. An empirical estimate of I using Table 1 may be the mutual information noise floor. Moreover, to decrease the value of I, the predictive data analysis computing entity 106 may increase the size of the training set, as doing so will increase the output of the defined quantile functions for 0<q<1.

At step/operation 703, the predictive data analysis computing entity 106 determines a limited noise subset of the categorically refined features based at least in part on a selected subset of the plurality of categorically refined features whose respective per-feature mutual information measures satisfy a condition defined by the mutual information noise floor. For example, in some embodiments, to determine the limited noise subset of the categorically refined features, the predictive data analysis computing entity 106 may include any categorically refined feature whose per-feature mutual information measures exceed the per-feature mutual information measure as part of the limited noise subset of the categorically refined features. As another example, in some embodiments, to determine the limited noise subset of the categorically refined features, the predictive data analysis computing entity 106 may include any categorically refined feature whose per-feature mutual information measures equal or exceed the per-feature mutual information measure as part of the limited noise subset of the categorically refined features.

At step/operation 704, the predictive data analysis computing entity 106 generates the limited noise training set based at least in part on the limited noise subset of the categorically refined features. In some embodiments, to generate the limit noise training set, the predictive data analysis computing entity 106 first adopts the limited noise subset of the categorically refined features as the limited noise features. Afterward, the predictive data analysis computing entity 106 removes all data values not associated with the limited noise features from the categorically refined training set to generate the limited noise subset.

In general, a limited noise feature may be any data feature whose per-feature mutual information measure is deemed to satisfy a condition defined by a mutual information noise floor. For example, given a set of data features that include a first feature describing whether training data entries are associated with the state of New York, a second feature describing whether training data entries are associated with the state of Texas, a third feature describing whether training data entries associated with the state of California, and a fourth feature corresponding to a merged categorical level describing whether training data entries are associated with a state other than the states of New York, Texas, and California, if the set of limited noise features does not include the second feature, this may describe that the per-feature mutual information measure for the second field does not satisfy a condition defined by the mutual information noise floor for all four data features.

Moreover, a limited noise training set may describe any transformed training set that has been generated by removing those data features not deemed to have a sufficient per-feature mutual information measure from a source training set. For example, given a source training set that is associated with a first feature describing whether training data entries are associated with the state of New York, a second feature describing whether training data entries are associated with the state of Texas, a third feature describing whether training data entries associated with the state of California, and a fourth feature corresponding to a merged categorical level describing whether training data entries are associated with a state other than the states of New York, Texas, and California, if only the first and third features are deemed to have a sufficient per-feature mutual information measure, then the limited noise training set generated based at least in part on the noted source training set does not include data features corresponding to the second feature or the fourth feature.

Returning to FIG. 5, at step/operation 503, the predictive data analysis computing entity 106 performs feature-correlation-based feature filtering on the limited noise training set to generate a limited correlation training set. In some embodiments, to perform the feature-correlation-based feature filtering on the limited noise training set to generate the limited correlation training set, the predictive data analysis computing entity 106 first generates a group of limited correlation features that include a subset of limited noise features based at least in part on each per-feature-pair symmetric correlation measure for a pair of training data features. Afterwards, the predictive data analysis computing entity 106 generates the limited correlation training set by removing each limited noise feature not included in the group of limited correlation fields from the limited noise training set.

In some embodiments, to perform step/operation 503, the predictive data analysis computing entity 106 first ranks the limited noise features by the per-feature mutual information measure of those limited noise features with respect to the training target feature. Afterward, the predictive data analysis computing entity 106 traverses the rank-ordered list of the limited noise features by excluding each limited noise feature $T_{k+1}$ if the per-feature-pair symmetric correlation measure of the limited noise feature $T_{k+1}$ and the preceding limited noise feature $T_k$ exceed some per-feature-pair symmetric correlation threshold (e.g., 0.95). This process is repeated until no further exclusions are necessary, which in experiments can analyze the entire list of limited noise features in linear time (as opposed to a matrix-based approach that has a polynomial time).

An operational example of the operations described in the previous paragraph is provided herein. Let the target variable be spending more than $20,000 on an annual holiday. Let the features include a high-income indicator and an indicator that the individual works in an investment bank (amongst others). Assume that the rank ordering includes the pair <high-income>, <works in investment bank> in descending order of importance to the target. The correlation between <high-income> and <works in investment bank> is then ascertained—if in the set it exceeds some threshold (e.g. 0.95) then <works in investment bank> will be excluded as a feature, as its predictive power is adequately captured in the <high-income> feature.

In some embodiments, to perform step/operation 503, the predictive data analysis computing entity 106 performs the following operations for each feature pair that includes a first limited noise feature and a second limited noise feature pair: first, the predictive data analysis computing entity 106 determines whether the per-feature-pair symmetric correlation measure for the feature pair exceeds a per-feature-pair symmetric correlation threshold. Afterward, in response to determining that the per-feature-pair symmetric correlation measure for the feature pair exceeds the per-feature-pair symmetric correlation threshold, the predictive data analysis computing entity 106 excludes one of the first limited noise feature associated with the feature pair or the second limited noise feature associated with the feature pair (e.g., the limited noise feature lower ranked in a ranked list of the limited noise features in accordance with the per-field mutual information measures of those limited noise features) from the adopted list of limited correlation features.

In general, a per-feature-pair symmetric correlation measure may describe an estimated level of statistical correlation between values of a corresponding pair of data features in relation to a target feature. For example, a data feature describing education and a data feature describing poverty may have a high statistical correlation in relation to a target feature that describes criminality of individuals described by corresponding training features, and thus a feature pair describing the two noted data features may have a relatively high per-feature-pair symmetric correlation measure. As another example, a data feature describing income and a data feature describing body mass index may have a high statistical correlation in relation to a target feature that describes criminality of individuals described by corresponding training features, and thus a feature pair describing the two noted data features may have a relatively low per-feature-pair symmetric correlation measure.

Furthermore, a limited correlation feature may be any data feature whose per-feature-pair symmetric correlation measures with respect to other data features associated with a dataset including the limited correlation feature fall below a corresponding per-feature-pair symmetric correlation measure. For example, given a dataset that includes a first data feature describing education, a second data feature describing income, and a third data feature describing criminality, if the target feature of the dataset is occurrence of criminal conduct in the background of individuals described by the data entries of the dataset, and further if the first data feature is deemed to be sufficiently correlated with the second data feature, the first data feature is deemed to be insufficiently correlated with the third data feature, and the second data feature is deemed to be insufficiently correlated with the third data feature, then the limited correlation features for the dataset may include the first data feature and the third data feature.

Moreover, a limited correlation training set may describe a training set that is generated by excluding one data feature from each feature pair deemed to have a high degree of per-feature-pair symmetric correlation measure from a source training set. For example, given a source dataset given a dataset that includes a first data feature describing education, a second data feature describing income, and a third data feature describing criminality, if the limited correlation features for the dataset include the first data feature and the second data feature, then the limited correlation training set may exclude data values associated with the second data feature.

B. Model Training Operations

Returning to FIG. 4, at step/operation 402, the predictive data analysis computing entity 106 generates a categorical input machine learning model based at least in part on the adjusted training set. In some embodiments, to generate the categorial input machine learning model, the predictive data analysis computing entity 106 first generates training data feature value arrangements for each training data entry of the adjusted training set, determines a target distribution based at least in part on each training data feature value arrangement with respect to the training target feature, and determines a mean-deviating subset of the training data feature value arrangements based at least in part on the target distribution. Afterward, the predictive data analysis computing entity 106 may generate the categorical input machine learning model based at least in part on each mean-deviating subset for a training data entry.

In general, a categorical input machine learning model may include a collection of patterns of selected values for a group of data features that, when each pattern in the collection of patterns is satisfied by a corresponding prediction input data entry, recommends associating the prediction input data entry with a probability measure for the satisfied pattern. For example, consider a categorical input machine learning model that includes the following collection of patterns: a first pattern according to which a person of a particular educational range and a particular body mass index range residing in Texas is 10% likely to have a particular target feature disease (e.g., the pattern identified by the notation "Education=1, BMI=1, Texas=1→ Probability=0.10"); a second pattern according to which a male of the particular educational range and the particular body mass index range is 20% likely to have a particular target feature disease (e.g., the pattern identified by the notation "Male=1, Education=1, BMI=1→Probability=0"); and a third pattern according to which a female of a particular age range is 10% likely to have a particular target feature disease (e.g., the pattern "Male=0, Age=1→Probability=0.10"). In this example, if the categorical input machine learning model is presented with a prediction input data entry that describes a female of the particular age range residing in Texas, the categorical input machine learning model may be configured to recommend that the prediction input data entry be associated with a 10% likelihood of the target disease prediction.

In some embodiments, step/operation 402 may be performed in accordance with the process depicted in FIG. 8. The process depicted in FIG. 8 begins at step/operation 801 when the predictive data analysis computing entity 106 determines a mean-deviating subset of a group of training data feature value arrangements.

In some embodiments, step/operation 801 may be performed with respect to a particular training data entry of the adjusted training set in accordance with the process depicted in FIG. 9. The process depicted in FIG. 9 begins at step/operation 901 when the predictive data analysis computing entity 106 determines the group of training data feature value arrangements for the particular training data entry. In general, a training data feature value arrangement is a collection of selected values for an associated group of training data features. An exemplary training data feature value arrangement is one associated with a first pattern according to which a person of a particular educational range and a particular body mass index range residing in Texas is deemed to have a 10% likelihood of having a particular target feature disease. In the noted example, the noted exemplary training data feature value arrangement may be associated with an affirmative value of education for a first training data feature describing whether a corresponding training data entry has the particular educational range, an affirmative value of for a body-mass-index-related feature associating the training data entry with a particular body mass index range, and an affirmative value for a third training data feature describing whether a corresponding data entry is associated with the state of Texas.

In some embodiments, the predictive data analysis computing entity 106 determines the group of training data feature value arrangements for the particular training data entry by determining a group of feature subsets for the particular training data entry and assigning values to the group of feature subsets based at least in part on the data feature values of the particular training data entry. For example, given a training data entry that describes a man of a particular educational range, a particular body mass index range, and a particular age range, and further given a feature subset for the particular training data entry that includes a first feature describing whether a training data entry is associated with the particular educational range and a second feature describing whether a training data entry is associated with the particular age range, then the group of training data feature value arrangements for the particular training data entry may include a training data feature value arrangement that describes an affirmative value both for the first feature describing whether a training data entry is associated with the particular educational range and the second feature describing whether a training data entry is associated with the particular age range. As another example, given a training data entry that describes a woman of a particular educational range, a particular body mass index range, and a particular age range, and further given a feature subset for the particular training data entry that includes a first feature describing whether a training data entry is associated with the particular educational range and a second feature describing whether a training data entry is associated with the particular body mass index range, then the group of training data feature value arrangements for the particular training data entry may include a training data feature value arrangement that describes a negative value for the first feature describing whether a training data entry is associated the particular educational range and an affirmative value for the second feature describing whether a training data entry is associated with a particular age range.

In some embodiments, to determine the feature subsets for a particular training data entry, the predictive data analysis computing entity 106 combines a predefined number of deterministically-generated feature subsets and a predefined number of stochastically-generated feature subsets. In some of the noted embodiments, the precise number of the deterministically-generated feature subsets and/or the precise number of the stochastically-generated feature subsets may be determined by one or more hyper-parameters of the predictive data analysis computing entity 106 that may be provided by an administrator user profile of the predictive data analysis computing entity 106.

In some embodiments, to determine the deterministically-generated feature subset, the predictive data analysis computing entity 106 generates a list of feature subsets that begins with a feature subset that consists of the training data feature with the highest mutual information measure which is identified as $T_1$ (with the subscript indicating the position of the training data feature within a ranked list of the training data features of the adjusted training set based at least in part on the per-feature mutual information measures of the noted training data features) and continues with a feature subset $\{T_1, T_2\}$ in a manner such that in each feature subset that is in the ith position of the list, the training data feature $T_i$ first appears in a feature subset all the way up to the λth element of the list. Therefore, to determine the deterministically-generated feature subset, the predictive data analysis computing entity 106 may adopt the feature subsets defined by Equation 2:

$$D_S = \{T_1, \ldots, T_j\} \forall j \in \{1, \ldots, \lambda\} = \{T_1\}, \{T_2\}, \{T_1, T_2, T_3\}, \ldots, \{T_1, T_2, T_3, \ldots, T\lambda\} \quad \text{Equation 2}$$

In some embodiments, to determine the stochastically-generated feature subset, the predictive data analysis computing entity 106 randomly samples u feature subsets, where each of the u feature subsets includes a randomly-selected combination of v training data features of the adjusted training set. For example, the predictive data analysis computing entity 106 may randomly sample 300 feature subsets, where each feature subset includes a randomly-selected combination of three training data features of the adjusted training set.

At step/operation 902, the predictive data analysis computing entity 106 determines a target distribution with respect to the training target feature for the particular training data entry based at least in part on each training data feature value arrangement. The target distribution for a corresponding training data feature value arrangement may describe a measure of correlation of the corresponding training data feature value arrangement with respect to a training target feature. For example, given a training data feature value arrangement associated with a first pattern describing a person of a particular educational range and a particular body mass index range residing in Texas, if a training dataset includes twenty training data entries that are associated with the particular educational range, the particular body mass index range, the state of Texas, and an affirmative target feature disease, and if the training dataset further includes five training data entries that are associated with the particular educational range, the particular body mass index range, the state of Texas, and a negative target feature disease, then the target distribution for the noted training data feature value arrangement may be characterized by the values of twenty and five respectively.

In some embodiments, determining the target distribution for a training data feature value arrangement includes determining a potential value correspondence count of instances when the training data feature value arrangement corresponds to each potential value of the training target feature, where the potential value correspondence count associated with a training data feature value arrangement and a potential value of a training target feature describes the number of times that occurrence of the training data feature value arrangement in training data entries has been associated with the occurrence of the potential value. For example, given a binary training target feature T, the potential value correspondence counts associated with a training data feature value arrangement include $n_0 = |T_i \cap \{0\}|$ and $n_1 = |T_i \cap \{1\}|$. In some embodiments, to determine the no value and the $n_1$ value, the predictive data analysis computing entity 106 performs the operations of the Structured Query Language (SQL) statement SELECT $\{D\}$, sum(i=0) as n0, sum(i=1) as n1 GROUPBY $\{D\}$, where D is an element of a set of training data feature value arrangements. Thus, in some embodiment, step/operation 902 may comprise a "group by" operation.

At step/operation 903, the predictive data analysis computing entity 106 determines the mean-deviating subset of the training data feature value arrangements for the particular training data entry based at least in part on the target distribution. In some embodiments, determining the mean-deviating subset comprises determining a deviation measure for each training data feature value arrangement based at least in part on deviation of each potential value correspondence count for the training data feature value arrangement from a mean of the target distribution; and determining the mean-deviating subset based at least in part on each deviation measure for an training data feature value arrangement of the plurality of training data feature value arrangements. Thus, in some embodiments, step/operation 903 may comprise a filtering operation.

In some embodiments, to determine the mean-deviating subset of the training data feature value arrangements for the particular training data entry based at least in part on the target distribution, the predictive data analysis computing entity 106 performs a binomial test on each training data feature value arrangement to determine a mean of the population mean of the target training feature in the adjusted training set and excludes any training data feature value arrangements that fall inside of the confidence interval of the noted binomial test. To perform the noted binomial test, the predictive data analysis computing entity 106 may perform the operations of Equation 3:

$$G \sim \text{Binomial}(G_{n_0} + G_{n_1}, T_i') \quad \text{Equation 3}$$

In Equation 3, $G_{n_0} + G_{n_1}$ is the number of binomial test trials defined by the number of training data entries of the adjusted training set that had affirmative or negative values, while $T_i'$ is the determined population mean of the adjusted training set. In some embodiments, the binomial test may be performed in accordance with a binomial confidence interval which may be determined based at least in part on the parameter $\alpha = 0.99$.

Returning to FIG. 8, at step/operation 802, the predictive data analysis computing entity 106 determines a point probability estimation for each training data feature value arrangement that is in the mean-deviating subset of at least one training data feature. In other words, for each training data feature value arrangement that survives the filtering operations of the step/operation 801, the predictive data analysis computing entity 106 generates a point probability estimation. In some embodiments, to determine a point probability estimation of a training data feature value arrangement, the predictive data analysis computing entity 106 computes a selected distribution (e.g., a Beta distribution) determined based at least in part on each potential value correspondence count for the training data feature value arrangement and determines the point probability estimation based at least in part on the selected distribution for the training data feature value arrangement.

In some embodiments, to determine a point probability estimation of a training data feature value arrangement, the predictive data analysis computing entity 106 performs the operations of Equation 4:

$$M_p = \text{Beta}(\alpha = G_{n_0}+1, \beta = G_{n_1}, q=0.5) \quad \text{Equation 4}$$

In Equation 4, $G_{n_0}$ is the count of zero-valued target training features associated with the training data feature value arrangement, $G_{n_1}$ is the count of one-valued target training features associated with the training data feature value arrangement, Beta is the quantile function for the Beta distribution, and $M_p$ is the optimal probability estimation for the training data feature value arrangement.

In some embodiments, to determine a point probability estimation of a training data feature value arrangement, the predictive data analysis computing entity 106 performs the operations of Equation 5:

$$M_p = \frac{G_{n_1}}{G_{n_0} + G_{n_1}} \quad \text{Equation 5}$$

In Equation 5, $G_{n_0}$ is the count of zero-valued target training features associated with the training data feature value arrangement, $G_{n_1}$ is the count of one-valued target training features associated with the training data feature value arrangement, and $M_p$ is the point probability estimation for the training data feature value arrangement.

At step/operation 803, the predictive data analysis computing entity 106 generates the categorical input machine learning model based at least in part on each mean-deviating subset of the training data feature value arrangements for each training data entry as well as each optimal probability estimation for each training data feature value arrangement in a mean-deviating subset of a training data entry. In some embodiments, the categorical input machine learning model describes: (i) each training data feature value arrangement that is in the mean-deviating subset of at least one training data entry, and (ii) for each described training data feature value arrangement, the optimal probability estimation for the training data feature value arrangement as a predictive score of the noted training data feature value arrangement.

C. Predictive Inference Operations

Returning to FIG. 4, at step/operation 403, the predictive data analysis computing entity 106 performs a prediction on a prediction input data entry using the categorical input machine learning model. In some embodiments, to perform a prediction on the prediction input data entry using the categorical input machine learning model, the predictive data analysis computing entity 106 generates a matching subset of the plurality of training data feature value arrangements that correspond to the input feature value arrangement, generates an inferred prediction for the prediction input data entry based at least in part on the matching subset, and generates explanatory metadata for the inferred prediction based at least in part on each training data feature value arrangement in the selected subset.

In some embodiments, step/operation 403 can be performed in accordance with the process depicted in FIG. 10. The process depicted in FIG. 10 begins at step/operation 1001 when the predictive data analysis computing entity 106 determines a matching subset of the training data feature value arrangements associated with the categorical input machine learning model that correspond to an input feature value arrangement associated with the prediction input data entry. In some embodiments, a training data feature value arrangement is deemed to correspond to the prediction input data entry if the prediction input data entry includes the pattern described by the training data feature value arrangement. For example, given a prediction input data entry that describes a male of a particular age range, a particular body mass index range, and a particular income range from Texas, the noted prediction input data entry will correspond to the following exemplary training data feature value arrangements: a training data feature value arrangement that corresponds to an affirmative value for a training data feature describing whether a training data entry is a man and an affirmative value for a training data feature describing whether a training data entry has the particular income range; a training data feature value arrangement that corresponds to an affirmative value for a training data feature describing whether a training data entry is associated with Texas and an affirmative value for a training data feature describing whether a training data entry has the particular income range; a training data feature value arrangement that corresponds to an affirmative value for a training data feature describing whether a training data entry is a man and an affirmative value for a training data feature describing whether a training data entry has the particular body mass index range; and/or the like.

At step/operation 1002, the predictive data analysis computing entity 106 generates an inferred prediction for the prediction input data entry based at least in part on the matching subset. In some embodiments, the predictive data analysis computing entity 106 generates the inferred prediction based at least in part on at least one of the training data feature value arrangements in the matching subset.

For example, in some embodiments, the predictive data analysis computing entity 106 generates the inferred prediction based at least in part on a training data feature value arrangement that is in the matching subset and that has the highest mean-wide cross-entropy measure relative to other training data feature value arrangements in the matching subset. In general, the mean-wide cross-entropy measure of a training data feature value arrangement may describe the cross-entropy of the training data feature value arrangement from a training population mean of the adjusted training subset. In some embodiments, the mean-wide cross-entropy measure for a training data feature value arrangement is determined based at least in part on Kullback-Leibler divergence of the point probability estimation for the training data feature value arrangement from a mean for all of the training data feature value arrangements in the adjusted training dataset.

In some embodiments, to determine the training data feature value arrangement that is in the matching subset and that has the highest mean-wide cross-entropy measure relative to other training data feature value arrangements in the matching subset, the predictive data analysis computing entity 106 may perform the operations of Equation 6 and Equation 7:

$$M^{opt} = \arg\max_{M \in M_C} D_{KL}(M, p_o) \quad \text{Equation 6}$$

$$p(X_D) = M^{opt} \quad \text{Equation 7}$$

In Equations 6-7, $M_C$ is the matching subset, $D_{KL}$ is a measure of Kullback-Leibler divergence, $p_o$ is a population mean (e.g., $p_o=T_i'$), $M^{opt}$ is the training data feature value arrangement that is in matching subset and that has the highest mean-wide cross-entropy measure relative to other training data feature value arrangements in the matching subset, $X_D$ is the prediction input data entry, and $p(X_D)$ is the inferred prediction.

In some embodiments, the predictive data analysis computing entity 106 generates the inferred prediction based at least in part on combining a weighted point probability estimation value for each training data feature value arrangement that is in the matching subset. In some of the noted embodiments, the predictive data analysis computing entity 106 determines a weighted point probability estimation for each training data feature value arrangement that is in the matching subset and combines each weighted point probability estimation value for a training data feature value arrangement that is in the matching subset to generate the inferred prediction.

In general, a weighted point probability estimation for a corresponding training data feature value arrangement is a value that describes the probability estimation of the corresponding training data feature value arrangement along with a weight value for the noted point probability estimation, where the weight value may determine a mean-wide cross-entropy of the point probability estimation for the corresponding training data feature value arrangement (which may be determined, for example, based at least in part on a Kullback-Leibler divergence of the point probability estimation for the training data feature value arrangement from a mean point probability estimation for all of the training data feature value arrangements in the adjusted training dataset).

In some embodiments, to generate the inferred prediction based at least in part on weighted point probability estimations of the training data feature value arrangements in the matching subset, the predictive data analysis computing entity 106 may perform the operations of Equation 8:

$$p(X_D) = \sum_{m \in M_C} w_m M_p^m \qquad \text{Equation 8}$$

In Equation 8, $M_C$ is the matching subset, $w_m$ is the weight measure for a training data feature value arrangement that is in the matching subset, $M_p^m$ is the point probability estimation for a training data feature value arrangement that is in the matching subset, $X_D$ is the prediction input data entry, and $p(X_D)$ is the inferred prediction.

At step/operation 1003, the predictive data analysis computing entity 106 generates explanatory metadata for the inferred prediction based at least in part on each training feature value arrangement. In some embodiments, when the inferred prediction is determined based at least in part on a selected training feature value arrangement that is in the matching subset and that has the highest mean-wide cross-entropy measure relative to other training data feature value arrangements in the matching subset, the predictive data analysis computing entity 106 determines the explanatory metadata for the inferred prediction based at least in part on the conditions defining the data feature value pattern of the selected training feature value arrangement. For example, if the selected training feature value arrangement corresponds to an affirmative value for a training data feature describing whether a training data entry is associated with Texas and an affirmative value for a training data feature describing whether a training data entry is of a particular income range, the explanatory metadata may describe that the inferred prediction the inferred prediction results from the presence in the prediction input data entry of an affirmative value for a training data feature describing whether a training data entry is associated with Texas and an affirmative value for a training data feature describing whether a training data entry is of the particular income range. In some embodiments, when the inferred prediction is determined based at least in part on a selected training feature value arrangement that is in the matching subset and that has the highest mean-wide cross-entropy measure relative to other training data feature value arrangements in the matching subset, the explanatory metadata for the inferred prediction may include the point probability estimation for the selected training feature value arrangement and/or the mean-wide cross-entropy measure for the selected training data feature value arrangement.

In some embodiments, when the inferred prediction is determined by combining a weighted point probability estimation value for each training data feature value arrangement that is in the matching subset, the predictive data analysis computing entity 106 may determine the explanatory metadata the inferred prediction based at least in part on the conditions defining the data feature value pattern of each training data feature value arrangement that is in the matching subset. In some embodiments, when the inferred prediction is determined by combining a weighted point probability estimation value for each training data feature value arrangement that is in the matching subset, the explanatory metadata for the inferred prediction may include each point probability estimation for each training data feature value arrangement that is in the matching subset and/or a mean-wide cross-entropy measure for each training data feature value arrangement that is in the matching subset.

In some embodiments, the explanatory metadata include a model complexity measure for the training data feature value arrangements used to generate the inferred measure. For example, when the inferred prediction is determined based at least in part on a selected training feature value arrangement that is in the matching subset and that has the highest mean-wide cross-entropy measure relative to other training data feature value arrangements in the matching subset, the explanatory metadata may include the model complexity measure for the model that corresponds to the selected training feature value arrangement. As another example, when the inferred prediction is determined combining a weighted point probability estimation value for each training data feature value arrangement that is in the matching subset, the explanatory metadata may include each model complexity measure for a model that corresponds to a training data feature value arrangement that is in the matching subset.

In general, a model complexity measure may describe a number of conditions associated with a pattern of data feature values characterizing a corresponding training data feature value arrangement. For example, given a training data feature value arrangement associated with a first pattern according to which a person having a particular educational range and a particular body mass index range residing in Texas is 10% likely to have a particular target feature disease, the model complexity measure for the noted training data feature value arrangement may be three. As another example, given a training data feature value arrangement associated with a first pattern according to which a person of a particular educational range, a particular income range, and a particular body mass index range residing in Texas is 20% likely to have a particular target feature disease, the model complexity measure for the noted training data feature value arrangement may be four.

At step/operation 1004, the predictive data analysis computing entity 106 performs one or more prediction-based actions based at least in part on the inferred prediction and the explanatory metadata. In some embodiments, performing the prediction-based actions comprises enabling display of a prediction output user interface that displays the inferred prediction and the explanatory metadata.

Operational examples of prediction output user interfaces are depicted in FIGS. 11A-11C. As depicted in FIG. 11A, the prediction output user interface 1100 includes many predictions each associated with a training data feature value arrangement. The prediction output user interface 1100 describes, for each prediction, the corresponding prediction logic 1102 for the prediction generated in accordance with the explanatory metadata for the prediction as well as the corresponding point probability estimation 1101 for the prediction. As depicted in FIG. 11B, the prediction output user interface 1110 includes many predictions each associated with a training data feature value arrangement. The prediction output user interface 1110 describes, for each prediction, the model complexity measure for the prediction logic 1112 as well as the corresponding point probability estimation 1111 for the prediction. As depicted in FIG. 11C, the prediction output user interface 1120 depicts the prediction logic 1122 and the point probability estimation 1121 for a single selected prediction that is associated with a selected training data feature value arrangement.

In some embodiments, the predictive data analysis computing entity 106 may determine one or more patient health predictions (e.g., one or more urgent care predictions, one or more medication need predictions, one or more visitation need predictions, and/or the like) based at least in part on the inferred predictions and perform one or more prediction-based actions based at least in part on the noted determined patient health predictions. Examples of prediction-based actions that may be performed based at least in part on the patient health predictions include automated physician notifications, automated patient notifications, automated medical appointment scheduling, automated drug prescription recommendation, automated drug prescription generation, automated implementation of precautionary actions, automated hospital preparation actions, automated insurance workforce management operational management actions, automated insurance server load balancing actions, automated call center preparation actions, automated hospital preparation actions, automated insurance plan pricing actions, automated insurance plan update actions, and/or the like.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
   receiving, by one or more processors, a request comprising a prediction input data entry;
   inputting, by the one or more processors, the prediction input data entry to a categorical input machine learning model to receive an inferred prediction for the prediction input data entry as an output of the categorical input machine learning model, wherein:
   (i) the categorical input machine learning model defines a plurality of training data feature value arrangements, and
   (ii) the inferred prediction is generated based on a matching subset of the plurality of training data feature value arrangements that correspond to the prediction input data entry;
   identifying, by the one or more processors, a selected training data feature value arrangement from the matching subset of the plurality of training data feature value arrangements that correspond to the prediction input data entry based on a comparison between (a) a mean-wide cross-entropy measure corresponding to the selected training data feature value arrangement and (b) a plurality of mean-wide cross-entropy measures respectively corresponding to the plurality of training data feature value arrangements within the matching subset; and
   in response to receipt of the request, providing, by the one or more processors, the inferred prediction with explanatory metadata descriptive of the selected training data feature value arrangement.

2. The computer-implemented method of claim 1, further comprising:
   generating the plurality of mean-wide cross-entropy measures that respectively correspond to the plurality of training data feature value arrangements within the matching subset.

3. The computer-implemented method of claim 1, further comprising:
   generating a plurality of weighted point probability estimation values that respectively correspond to the plurality of training data feature value arrangements within the matching subset; and
   generating the inferred prediction by combining the plurality of weighted point probability estimation values.

4. The computer-implemented method of claim 1, wherein:
   the inferred prediction is determined based at least in part on the selected training data feature value arrangement of the plurality of training data feature value arrangements within the matching subset, and
   generating the explanatory metadata is performed based at least in part on the selected training data feature value arrangement.

5. The computer-implemented method of claim 1, wherein the explanatory metadata comprises a model complexity measure for the selected training data feature value arrangement.

6. The computer-implemented method of claim 1, further comprising enabling display of a prediction output user interface.

7. The computer-implemented method of claim 6, wherein the prediction output user interface is configured to display the inferred prediction and the explanatory metadata.

8. The computer-implemented method of claim 1, wherein the selected training data feature value arrangement is identified based on the plurality of mean-wide cross-entropy measures respectively corresponding to the matching subset of the plurality of training data feature value arrangements.

9. A system comprising memory and one or more processors communicatively coupled to the memory, the one or more processors configured to:
   receive a request comprising a prediction input data entry;
   input the prediction input data entry to a categorical input machine learning model to receive an inferred prediction for the prediction input data entry as an output of the categorical input machine learning model, wherein:
   (i) the categorical input machine learning model defines a plurality of training data feature value arrangements, and
   (ii) the inferred prediction is generated based on a matching subset of the plurality of training data feature value arrangements that correspond to the prediction input data entry;
   identify a selected training data feature value arrangement from the matching subset of the plurality of training data feature value arrangements that correspond to the prediction input data entry based on a comparison between (a) a mean-wide cross-entropy measure corresponding to the selected training data feature value arrangement and (b) a plurality of mean-wide cross-entropy measures respectively corresponding to the plurality of training data feature value arrangements within the matching subset; and
   in response to receipt of the request, provide the inferred prediction with explanatory metadata descriptive of the selected training data feature value arrangement.

10. The system of claim 9, wherein the one or more processors are further configured to:
   generate the plurality of mean-wide cross-entropy measures that respectively correspond to the plurality of training data feature value arrangements within the matching subset.

11. The system of claim 9, wherein the one or more processors are further configured to:
   generate a plurality of weighted point probability estimation values that respectively correspond to the plurality of training data feature value arrangements within the matching subset; and
   generate the inferred prediction by combining the plurality of weighted point probability estimation values.

12. The system of claim 9, wherein:
   the inferred prediction is determined based at least in part on the selected training data feature value arrangement of the plurality of training data feature value arrangements within the matching subset, and
   the one or more processors are further configured to generate the explanatory metadata based at least in part on the selected training data feature value arrangement.

13. The system of claim 9, wherein the explanatory metadata comprises a model complexity measure for the selected training data feature value arrangement.

14. The system of claim 9, wherein the one or more processors are further configured to enable display of a prediction output user interface.

15. The system of claim 14, wherein the prediction output user interface is configured to display the inferred prediction and the explanatory metadata.

16. One or more non-transitory computer-readable storage media including instructions that, when executed by one or more processors, cause the one or more processors to:
   receive a request comprising a prediction input data entry;
   input the prediction input data entry to a categorical input machine learning model to receive an inferred prediction for the prediction input data entry as an output of the categorical input machine learning model, wherein:
   (i) the categorical input machine learning model defines a plurality of training data feature value arrangements, and
   (ii) the inferred prediction is generated based on a matching subset of the plurality of training data feature value arrangements that correspond to the prediction input data entry;
   identify a selected training data feature value arrangement from the matching subset of the plurality of training data feature value arrangements that correspond to the prediction input data entry based on a comparison between (a) a mean-wide cross-entropy measure corresponding to the selected training data feature value arrangement and (b) a plurality of mean-wide cross-entropy measures respectively corresponding to the plurality of training data feature value arrangements within the matching subset; and
   in response to receipt of the request, provide the inferred prediction with explanatory metadata descriptive of the selected training data feature value arrangement.

17. The one or more non-transitory computer-readable storage media of claim 16, wherein the one or more processors are further configured to:
   generate the plurality of mean-wide cross-entropy measures that respectively correspond to the plurality of training data feature value arrangements within the matching subset.

18. The one or more non-transitory computer-readable storage media of claim 16, wherein the one or more processors are further configured to:
   generate a plurality of weighted point probability estimation values that respectively correspond to the plurality of training data feature value arrangements within the matching subset; and
   generate the inferred prediction by combining the plurality of weighted point probability estimation values.

19. The one or more non-transitory computer-readable storage media of claim 16, wherein:
   the inferred prediction is determined based at least in part on the selected training data feature value arrangement of the plurality of training data feature value arrangements within the matching subset, and
   the one or more processors are further configured to generate the explanatory metadata based at least in part on the selected training data feature value arrangement.

20. The one or more non-transitory computer-readable storage media of claim 16, wherein the explanatory metadata comprises a model complexity measure for the selected training data feature value arrangement.

* * * * *